(12) United States Patent
Girvin et al.

(10) Patent No.: US 11,037,068 B2
(45) Date of Patent: Jun. 15, 2021

(54) TECHNIQUES FOR QUANTUM ERROR CORRECTION USING BOSONIC MODES AND RELATED SYSTEMS AND METHODS

(71) Applicant: Yale University, New Haven, CT (US)

(72) Inventors: Steven M. Girvin, Hamden, CT (US); Liang Jiang, Guilford, CT (US); Marios H. Michael, New Haven, CT (US); Matti Silveri, New Haven, CT (US); Richard T. Brierley, New Haven, CT (US); Victor V. Albert, New Haven, CT (US); Juha Salmilehto, New Haven, CT (US)

(73) Assignee: Yale University, New Haven, CT (US)

( * ) Notice: Subject to any disclaimer, the term of this patent is extended or adjusted under 35 U.S.C. 154(b) by 110 days.

(21) Appl. No.: 15/781,233

(22) PCT Filed: Dec. 2, 2016

(86) PCT No.: PCT/US2016/064609
§ 371 (c)(1),
(2) Date: Jun. 4, 2018

(87) PCT Pub. No.: WO2017/151200
PCT Pub. Date: Sep. 8, 2017

(65) Prior Publication Data
US 2020/0242500 A1 Jul. 30, 2020

Related U.S. Application Data

(60) Provisional application No. 62/263,473, filed on Dec. 4, 2015.

(51) Int. Cl.
*G06N 10/00* (2019.01)
*G06F 11/10* (2006.01)
*G06F 11/32* (2006.01)

(52) U.S. Cl.
CPC ............. *G06N 10/00* (2019.01); *G06F 11/10* (2013.01); *G06F 11/322* (2013.01)

(58) Field of Classification Search
CPC ........ G06F 11/10; G06F 11/322; G06N 10/00
See application file for complete search history.

(56) References Cited

U.S. PATENT DOCUMENTS

| | | | |
|---|---|---|---|
| 7,498,832 B2 | 3/2009 | Baumgardner et al. | |
| 8,242,799 B2 | 8/2012 | Pesetski et al. | |

(Continued)

FOREIGN PATENT DOCUMENTS

| | | |
|---|---|---|
| WO | WO 2016/138378 A1 | 9/2016 |
| WO | WO 2017/065856 A1 | 4/2017 |
| WO | WO 2017/139683 A1 | 8/2017 |

OTHER PUBLICATIONS

Girvin, Basic concepts in quantum information. Strong Light-Matter Coupling: From Atoms to Solid-State Systems. 2013:155-206.

(Continued)

*Primary Examiner* — Allan R Wilson
(74) *Attorney, Agent, or Firm* — Wolf, Greenfield & Sacks, P.C.

(57) ABSTRACT

Some aspects are directed to a method of operating a circuit quantum electrodynamics system that includes a physical qubit dispersively coupled to a quantum mechanical oscillator, the method comprising measuring a parity of a first state of the quantum mechanical oscillator, subsequent to measuring the parity of the first state, measuring a parity of a second state of the quantum mechanical oscillator, the second state being different from the first state, applying a first drive waveform to the quantum mechanical oscillator, and applying a second drive waveform to the physical qubit concurrent with the application of the first drive waveform, wherein the first drive waveform and the second drive (Continued)

waveform are selected based at least in part on a result of comparing the measured parity of the second state to the measured parity of the first state.

21 Claims, 9 Drawing Sheets

(56) References Cited

U.S. PATENT DOCUMENTS

| | | | |
|---|---|---|---|
| 8,294,138 | B2 | 10/2012 | Farinelli et al. |
| 8,508,280 | B2 | 8/2013 | Naaman et al. |
| 2010/0295598 | A1 | 11/2010 | Darabi et al. |
| 2014/0365843 | A1 | 12/2014 | Ashikhmin |
| 2016/0233965 | A1 | 8/2016 | Medford |
| 2016/0254646 | A1 | 9/2016 | Li et al. |
| 2017/0104493 | A1* | 4/2017 | Goto .................. H01L 39/223 |
| 2020/0334101 | A1 | 10/2020 | Albert et al. |

OTHER PUBLICATIONS

Girvin, Wiring Up Quantum Systems: Circuit QED with Artificial Atoms and Microwave Photons. Conference on Coherence and Quantum Optics. Jun. 17, 2013:M4B-1.
Gottesman, An introduction to quantum error correction and fault-tolerant quantum computation. Quantum information science and its contributions to mathematics, Proceedings of Symposia in Applied Mathematics Apr. 2010;68:13-58.
Grassl et al., Quantum error-correcting codes for qudit amplitude damping. IEEE Transactions on Information Theory. Jun. 2018;64(6):4674-85.
Hachohen-Gourgy et al.. Cooling and autonomous feedback in a bose-hubbard chain with attractive interactions. Physical review letters. Dec. 9, 2015;115(24):240501.
Hafezi et al., Chemical potential for light by parametric coupling. Physical Review B. Nov. 19, 2015;92(17):174305.
Helmer et al., Quantum nondemolition photon detection in circuit QED and the quantum Zeno effect. Physical Review A. May 20, 2009;79(5):052115.
Home et al., Complete methods set for scalable ion trap quantum information processing. Science. Sep. 4, 2009;325(5945):1227-30.
Ince et al., The case for open computer programs. Nature. Feb. 2012;482(7386):485-8.
Kelly et al., State preservation by repetitive error detection in a superconducting quantum circuit. Nature. Mar. 2015;519(7541):66.
Knill et al., Theory of quantum error-correcting codes. Physical Review A. Feb. 1, 1997;55(2):900.
Korotkov, Flying microwave qubits with nearly perfect transfer efficiency. Physical Review B. Jul. 25, 2011;84(1):014510.
Laflamme et al., Perfect quantum error correcting code. Physical Review Letters. Jul. 1, 1996;77(1):198-201.
Lamont et al., Route to stabilized ultrabroadband microresonator-based frequency combs. Optics letters. Sep. 15, 2013;38(18):3478-81.
Lamoreaux et al., Analysis of single-photon and linear amplifier detectors for microwave cavity dark matter axion searches. Physical Review D. Aug. 23, 2013;88(3):035020.
Lassen et al., Quantum optical coherence can survive photon losses using a continuous-variable quantum erasure-correcting code. Nature Photonics. Oct. 2010;4(10):700-5.
Leghtas et al., Stabilizing a Bell state of two superconducting qubits by dissipation engineering. Physical Review A. Aug. 27, 2013;88(2):023849.
Leung et al., Approximate quantum error correction can lead to better codes. Physical Review A. Oct. 1, 1997;56(4):2567-73.
Lloyd et al., Analog quantum error correction. Physical Review Letters. May 4, 1998;80(18):4088-91.
Mabuchi et al., Inversion of quantum jumps in quantum optical systems under continuous observation. Physical review letters. Apr. 22, 1996;76(17):3108-11.

Marquardt et al., Quantum theory of cavity-assisted sideband cooling of mechanical motion. Physical review letters. Aug. 28, 2007;99(9):093902.
McKay et al., High-contrast qubit interactions using multimode cavity QED. Physical review letters. Feb. 27, 2015;114(8):080501.
Meier et al., Signatures of quantum phase transitions in the dynamic response of fluxonium qubit chains. Physical Review B. Aug. 24, 2015;92(6):064516.
Morin et al., Shining light into black boxes. Science. Apr. 13, 2012;336(6078):159-60.
Moussa et al., Demonstration of sufficient control for two rounds of quantum error correction in a solid state ensemble quantum information processor. Physical review letters. Oct. 10, 2011;107(16):160501.
Mundhada et al., Generating higher-order quantum dissipation from lower-order parametric processes. Quantum Science and Technology. May 24, 2017;2(2):024005.
Nandkishore et al., Many-body localization and thermalization in quantum statistical mechanics. Annu. Rev. Condens. Matter Phys.. Mar. 10, 2015;6(1):15-38.
Ng, Simple approach to approximate quantum error correction based on the transpose channel. Physical Review A. Jun. 28, 2010;81(6):062342.
Niset et al., Experimentally feasible quantum erasure-correcting code for continuous variables. Physical review letters. Sep. 26, 2008;101(13):130503.
Peng, Reproducible research in computational science. Science. Dec. 2, 2011;334(6060):1226-7.
Plenio et al., Quantum error correction in the presence of spontaneous emission. Physical Review A. Jan. 1, 1997;55(1):67-71.
Riste et al., Detecting bit-flip errors in a logical qubit using stabilizer measurements. Nature Communications. Apr. 29, 2015;6:6983.
Romero et al., Microwave photon detector in circuit QED. Physical review letters. Apr. 29, 2009;102(17):173602.
Sete et al., Robust quantum state transfer using tunable couplers. Physical Review B. Apr. 22, 2015;91(14):144509.
Smith et al., Many-body localization in a quantum simulator with programmable random disorder. Nature Physics. Oct. 2016;12(10):907-10.
Srinivasan et al., Time-reversal symmetrization of spontaneous emission for quantum state transfer. Physical Review A. Mar. 31, 2014;89(3):033857.
Srinivasan et al., Tunable coupling in circuit quantum electrodynamics using a superconducting charge qubit with a V-shaped energy level diagram. Physical review letters. Feb. 22, 2011;106(8):083601.
Steane, Error correcting codes in quantum theory. Physical Review Letters. Jul. 29, 1996;77(5):793-7.
Sundaresan et al., Beyond strong coupling in a multimode cavity. Physical Review X. Jun. 29, 2015;5(2):021035.
Taminiau et al., Universal control and error correction in multi-qubit spin registers in diamond. Nature nanotechnology. Mar. 2014;9(3):171-6.
Terhal et al., Encoding a qubit into a cavity mode in circuit QED using phase estimation. Physical Review A. Jan. 11, 2016;93(1):012315.
Underwood et al., Measurement of the motional sidebands of a nanogram-scale oscillator in the quantum regime. Physical Review A. Dec. 2, 2015;92(6):061801.
Vlastakis et al., Violating Bell's inequality with an artificial atom and a cat state in a cavity. arXiv preprint arXiv: 1504.02512. Apr. 9, 2015.
Wenner et al., Catching time-reversed microwave coherent state photons with 99.4% absorption efficiency. Physical Review Letters. May 28, 2014;112(21):210501.
Wilson-Rae et al., Theory of ground state cooling of a mechanical oscillator using dynamical backaction. Physical Review Letters. Aug. 28, 2007;99(9):093901.
Yin et al., Catch and release of microwave photon states. Physical review letters. Mar. 4, 2013;110(10):107001.
Yurke et al., SU (2) and SU (1, 1) interferometers. Physical Review A. Jun. 1, 1986;33(6):4033-54.
Yurke et al., The dynamic generation of Schrödinger cats and their detection. Physica B. Jul. 1, 1988;151(1-2):298-301.

(56) References Cited

OTHER PUBLICATIONS

Zhang et al., Experimental implementation of encoded logical qubit operations in a perfect quantum error correcting code. Physical review letters. Sep. 6, 2012;109(10):100503.
Zheng et al., Demonstrating non-Abelian statistics of Majorana fermions using twist defects. Physical Review B. Dec. 31, 2015;92(24):245139.
International Search Report and Written Opinion dated Jul. 31, 2017 in connection with International Application No. PCT/US2016/064609.
International Preliminary Report on Patentability dated Jun. 14, 2018 in connection with International Application No. PCT/US2016/064609.
Zueco et al., Qubit-oscillator dynamics in the dispersive regime: analytical theory beyond rotating-wave approximation. Physical Review A. Jul. 20, 2009. 6 pages. URL:https://arxiv.org/abs/0907.3516.
Extended European Search Report for European Application No. 16892925.5, dated Jun. 28, 2019.
International Search Report and Written Opinion for International Application No. PCT/US2019/012438, dated Aug. 12, 2019.
Agarwal et al., Generation of pair coherent states and squeezing via the competition of four-wave mixing and amplified spontaneous emission. Physical review letters. Aug. 18, 1986;57(7):827.
Albert, Lindbladians with multiple steady states: theory and applications. Yale University Dissertation. May 2017, 134 pages.
Albert, Proposal for a Logical Qubit Encoded into a Stabilized Manifold in Two Bosonic Modes. APS March Meeting 2018. Abstract ID V33.007, 1 page.
Andrews et al., Bidirectional and efficient conversion between microwave and optical light. Nature Physics. Apr. 2014;10(4):321-6.
Aoki et al., Quantum error correction beyond qubits. Nature Physics. Aug. 2009;5(8):541-6.
Barends et al., Coherent Josephson qubit suitable for scalable quantum integrated circuits. Physical review letters. Aug. 22, 2013;111(8):080502.
Barends et al., Superconducting quantum circuits at the surface code threshold for fault tolerance. Nature. Apr. 2014;508(7497):500-3.
Barut et al., New "coherent" states associated with non-compact groups. Communications in Mathematical Physics. Mar. 1, 1971;21(1):41-55.
Bennet et al., Mixed-state entanglement and quantum error correction. Physical Review A. Nov. 1, 1996;54(5):3824-51.
Bény et al., General conditions for approximate quantum error correction and near-optimal recovery channels. Physical review letters. Mar. 23, 2010;104(12):120501.
Bény, Perturbative quantum error correction. Physical review letters. Aug. 16, 2011;107(8):080501.
Bertet et al., Direct measurement of the Wigner function of a one-photon Fock state in a cavity. Physical Review Letters. Oct. 28, 2002;89(20):200402.
Børkje et al., Observability of radiation-pressure shot noise in optomechanical systems. Physical Review A. Jul. 15, 2010;82(1):013818.
Børkje et al., Signatures of nonlinear cavity optomechanics in the weak coupling regime. Physical review letters. Aug. 2, 2013;111(5):053603.
Boulant et al., Experimental implementation of a concatenated quantum error-correcting code. Physical review letters. Apr. 8, 2005;94(13):130501.
Bradley et al., Microwave cavity searches for dark-matter axions. Reviews of Modern Physics. Jun. 12, 2003;75(3):777-817.
Braunstein et al., Quantum information with continuous variables. Reviews of Modern Physics. Jun. 29, 2005;77(2):513-77.
Braunsterin, Error Correction for Continuous Quantum Variables. Phys. Rev. Lett. May 4, 1998;80(18):4084-7.
Brecht et al., Multilayer microwave integrated quantum circuits for scalable quantum computing. NPJ Quantum Information. Feb. 23, 2016;2:16002.
Chembo et al., Modal expansion approach to optical-frequency-comb generation with monolithic whispering-gallery-mode resonators. Physical Review A. Sep. 7, 2010;82(3):033801.
Chembo et al., Spatiotemporal Lugiato-Lefever formalism for Kerr-comb generation in whispering-gallery-mode resonators. Physical Review A. May 31, 2013;87(5):053852.
Chiaverini et al., Realization of quantum error correction. Nature. Dec. 2004;432(7017):602-5.
Chuang et al., Bosonic quantum codes for amplitude damping. Physical Review A. Aug. 1, 1997;56(2):1114.
Cirac et al., Enforcing coherent evolution in dissipative quantum dynamics. Science. Aug. 30, 1996;273(5279):1207-10.
Cirac et al., Quantum state transfer and entanglement distribution among distant nodes in a quantum network. Physical Review Letters. Apr. 21, 1997;78(16):3221-4.
Clerk et al., Introduction to quantum noise, measurement, and amplification. Reviews of Modern Physics. Apr. 15, 2010;82(2):1155-208.
Coen et al., Modeling of octave-spanning Kerr frequency combs using a generalized mean-field Lugiato-Lefever model. Optics letters. Jan. 1, 2013;38(1):37-9.
Córcoles et al., Demonstration of a quantum error detection code using a square lattice of four superconducting qubits. Nature communications. Apr. 29, 2015;6:6979.
Cory et al., Experimental quantum error correction. Physical Review Letters. Sep. 7, 1998;81(10):2152-5.
Crépeau et al., Approximate quantum error-correcting codes and secret sharing schemes. Advances in Cryptology: Lecture Notes in Computer Science. 2005;3494:285-301.
Devoret et al., Superconducting circuits for quantum information: an outlook. Science. Mar. 8, 2013;339(6124):1169-74.
Fletcher et al., Optimum quantum error recovery using semidefinite programming. Physical Review A. Jan. 31, 2007;75(1):012338.
Flurin et al., Superconducting quantum node for entanglement and storage of microwave radiation. Physical review letters. Mar. 4, 2015;114(9):090503.
Gao et al., Noise properties of superconducting coplanar waveguide microwave resonators. Applied Physics Letters. Mar. 5, 2007;90(10):102507.
Gottesman et al., Encoding a qubit in an oscillator. Physical Review A. Jun. 11, 2001;64(1):012310.
Hatridge et al., Quantum back-action of an individual variable-strength measurement. Science. Jan. 11, 2013;339(6116):178-81.
Heeres et al., Cavity state manipulation using photon-number selective phase gates. Physical review letters. Sep. 22, 2015;115(13):137002.
Hofheinz et al., Synthesizing arbitrary quantum states in a superconducting resonator. Nature. May 2009;459(7246):546.
Houck et al., Generating single microwave photons in a circuit. Nature. Sep. 2007;449(7160):328-31.
Kirchmair et al., Observation of quantum state collapse and revival due to the single-photon Kerr effect. Nature. Mar. 2013;495(7440):205-9.
Koch et al., Charge-insensitive qubit design derived from the Cooper pair box. Physical Review A. Oct. 12, 2007;76(4):042319.
Krastanov et al., Universal control of an oscillator with dispersive coupling to a qubit. Physical Review A. Oct. 21, 2015;92(4):040303.
Leghtas et al., Confining the state of light to a quantum manifold by engineered two-photon loss. Science. Feb. 20, 2015;347(6224):853-7.
Leghtas et al., Hardware-efficient autonomous quantum memory protection. Physical Review Letters. Sep. 20, 2013;111(12):120501.
Lidar et al., Decoherence-free subspaces for quantum computation. Physical Review Letters. Sep. 21, 1998;81(12):2594.
Marquardt et al., Optomechanics. Physics. 2009;2:40.
Michael et al., New class of quantum error-correcting codes for a bosonic mode. Physical Review X. Jul. 14, 2016;6(3):031006.
Mirrahimi et al., Dynamically protected cat-qubits: a new paradigm for universal quantum computation. New Journal of Physics. Apr. 22, 2014;16(4):045014.
Murch et al., Cavity-assisted quantum bath engineering. Physical review letters. Oct. 31, 2012;109(18):183602.

(56) References Cited

OTHER PUBLICATIONS

Nakamura et al., Coherent control of macroscopic quantum states in a single-Cooper-pair box. Nature. Apr. 1999;398(6730):786-8.
Nigg et al, Stabilizer quantum error correction toolbox for superconducting qubits. Physical Review Letters. Jun. 14, 2013;110(24):243604.
Nigg et al., Black-box superconducting circuit quantization. Physical Review Letters. Jun. 12, 2012;108(24):240502.
Nigg et al., Quantum computations on a topologically encoded qubit. Science. Jul. 18, 2014;345(6194):302-5.
Ofek et al., Demonstrating quantum error correction that extends the lifetime of quantum information. arXiv preprint arXiv:1602.04768. Feb. 15, 2016, 44 pages.
Ofek et al., Extending the lifetime of a quantum bit with error correction in superconducting circuits. Nature. Aug. 2016;536(7617):441.
Paik et al., Observation of high coherence in Josephson junction qubits measured in a three-dimensional circuit QED architecture. Physical Review Letters. Dec. 5, 2011;107(24):240501.
Reagor et al., Quantum memory with near-millisecond coherence in circuit QED. Phys Rev B. 2016;94:014506.
Reagor et al., Reaching 10 ms single photon lifetimes for superconducting aluminum cavities. Applied Physics Letters. May 13, 2013;102(19):192604.
Reed et al., Realization of three-qubit quantum error correction with superconducting circuits. Nature. Feb. 2012;482(7385):382-5.
Rigetti et al., Superconducting qubit in a waveguide cavity with a coherence time approaching 0.1 ms. Physical Review B. Sep. 24, 2012;86(10):100506.
Sayrin et al., Real-time quantum feedback prepares and stabilizes photon number states. Nature. Sep. 2011;477(7362):73-7.
Schindler et al., Experimental repetitive quantum error correction. Science. May 27, 2011;332(6033):1059-61.
Schoelkopf et al., Wiring up quantum systems. Nature. Feb. 6, 2008;451(7179):664-9.
Schuster et al., Resolving photon number states in a superconducting circuit. Nature. Feb. 2007;445(7127):515-18.
Shankar et al., Autonomously stabilized entanglement between two superconducting quantum bits. Nature. Dec. 2013;504(7480):419.
Shor, Scheme for reducing decoherence in quantum computer memory. Physical review A. Oct. 1, 1995;52(4):R2493-6.
Silveri et al., New class of photonic quantum error correction codes. APS March Meeting 2016, Abstract ID K44.005, 1 page.
Silveri et al., Theory of remote entanglement via quantum-limited phase-preserving amplification. Physical Review A. Jun. 7, 2016;93(6):062310.
Sun et al., Tracking photon jumps with repeated quantum nondemolition parity measurements. Nature. Jul. 2014;511(7510):444-8.
Terhal, Quantum error correction for quantum memories. Reviews of Modern Physics. Apr. 7, 2015;87(2):307-46.
Vlastakis et al., Deterministically encoding quantum information using 100-photon Schrödinger cat states. Science. Nov. 1, 2013;342(6158):607-10.
Waldherr et al., Quantum error correction in a solid-state hybrid spin register. Nature. Feb. 2014;506(7487):204-7.
Zanardi et al., Noiseless quantum codes. Physical Review Letters. Oct. 27, 1997;79(17):3306.
International Preliminary Report on Patentability for International Application No. PCT/US2019/012438, dated Jul. 16, 2020.
Frattini et al., 3-wave mixing Josephson dipole element. Applied Physics Letters. May 29, 2017;110(22):222603.
U.S. Appl. No. 16/959,209, filed Jun. 30, 2020, Albert et al.

* cited by examiner

TECHNIQUES FOR QUANTUM ERROR CORRECTION USING BOSONIC MODES AND RELATED SYSTEMS AND METHODS

CROSS REFERENCE TO RELATED APPLICATIONS

This Application is a national stage filing under 35 U.S.C. 371 of International Patent Application Serial No. PCT/US2016/064609, filed Dec. 2, 2016, entitled "TECHNIQUES FOR QUANTUM ERROR CORRECTION USING BOSONIC MODES AND RELATED SYSTEMS AND METHODS," which claims priority to U.S. Provisional Patent Application No. 62/263,473, filed Dec. 4, 2015, entitled "QUANTUM ERROR CORRECTION CODES FOR BOSONIC MODES," each of which are incorporated herein by reference to the maximum extent allowable.

STATEMENT REGARDING FEDERALLY-SPONSORED RESEARCH AND DEVELOPMENT

This invention was made with government support under 1122492 and 1301798 awarded by National Science Foundation, under FA9550-14-1-0052 and FA9550-15-1-0015 awarded by United States Air Force Office of Scientific Research and W911NF-14-1-0011 and W911NF-14-1-0563 awarded by United States Army Research Office. The government has certain rights in the invention.

BACKGROUND

Quantum information processing techniques perform computations by manipulating one or more quantum objects. These techniques are sometimes referred to as "quantum computing." In order to perform computations, a quantum information processor utilizes quantum objects to reliably store and retrieve information. According to some quantum information processing approaches, a quantum analogue to the classical computing "bit" (being equal to 1 or 0) has been developed, which is referred to as a quantum bit, or "qubit." A qubit can be composed of any quantum system that has two distinct states (which may be thought of as 1 and 0 states), but also has the special property that the system can be placed into quantum superpositions and thereby exist in both of those states at once.

Several different types of qubits have been successfully demonstrated in the laboratory. However, the lifetime of the states of many of these systems before information is lost due to decoherence of the quantum state, or to other quantum noise, is currently around ~100 µs. Notwithstanding longer lifetimes, it may be important to provide error correction techniques in quantum computing that enable reliable storage and retrieval of information stored in a quantum system. However, unlike a classical computing system in which bits can be copied for purposes of error correction, it may not be possible to clone an unknown state of a quantum system. The system may, however, be entangled with other quantum systems which effectively spreads the information in the system out over several entangled objects.

SUMMARY

Some aspects are directed to a method of operating a circuit quantum electrodynamics system that includes a physical qubit dispersively coupled to a quantum mechanical oscillator, the method comprising measuring a parity of a first state of the quantum mechanical oscillator, subsequent to measuring the parity of the first state, measuring a parity of a second state of the quantum mechanical oscillator, the second state being different from the first state, applying a first drive waveform to the quantum mechanical oscillator, and applying a second drive waveform to the physical qubit concurrent with the application of the first drive waveform, wherein the first drive waveform and the second drive waveform are selected based at least in part on a result of comparing the measured parity of the second state to the measured parity of the first state, and wherein application of the first drive waveform and the second drive waveform, at least in part, transition the quantum mechanical oscillator from the second state back to the first state.

According to some embodiments, the first and second states are superpositions of the same plurality of photon number states, and the first and second states have different amplitudes.

According to some embodiments, the first and second drive waveforms are configured based on a duration between measuring the parity of the first state and measuring the parity of the second state.

According to some embodiments, measuring the parity of the first and second states each comprises measuring photon number parity modulo 2.

According to some embodiments, the first state is a superposition of a plurality of photon number states.

According to some embodiments, the first state is a superposition of two states that have equal mean photon numbers.

According to some embodiments, the first state is a superposition of $|W_\downarrow\rangle$ and $|W_\uparrow\rangle$ given by $$|W_{\uparrow/\downarrow}\rangle = \frac{1}{\sqrt{2^N}} \sum_{p\ even/odd}^{N+1} \sqrt{\binom{N+1}{p}} |p(S+1)\rangle,$$

where N and S are positive integers, and $|n\rangle$ denotes a photon number state with n photons.

According to some embodiments, the first state is a superposition of two states that each have a first mean photon number, and the second state is a superposition of two states that each have a second mean photon number, different from the first mean photon number.

According to some embodiments, the first and second drive waveforms are configured based on the values of $|W_\downarrow\rangle$ and $|W_\uparrow\rangle$.

According to some embodiments, the first and second drive waveforms are selected from a computer readable medium storing a plurality of previously determined drive waveforms.

According to some embodiments, measuring the parity of the first and second states each comprises measuring the photon number parity modulo N, where N is an integer greater than 2.

According to some embodiments, said transition of the quantum mechanical oscillator from the second state back to the first state does not pass through a ground state of the quantum mechanical oscillator.

According to some embodiments, the quantum mechanical oscillator is a microwave cavity.

According to some embodiments, the physical qubit is a transmon qubit.

Some aspects are directed to a system, comprising a circuit quantum electrodynamics system that includes a physical qubit dispersively coupled to a quantum mechanical oscillator, at least one computer readable medium storing a plurality of drive waveforms, at least one controller configured to measure a parity of a first state of the quantum mechanical oscillator, subsequent to measuring the parity of the first state, measure a parity of a second state of the quantum mechanical oscillator, the second state being different from the first state, select a first drive waveform and a second drive waveform from amongst the stored plurality of drive waveforms based at least in part on a result of comparing the measured parity of the second state to the measured parity of the first state, and at least one electromagnetic radiation source configured to apply the first drive waveform to the quantum mechanical oscillator, and apply the second drive waveform to the physical qubit concurrent with the application of the first drive waveform.

According to some embodiments, the first and second drive waveforms are configured based on a duration between measuring the parity of the first state and measuring the parity of the second state.

According to some embodiments, measuring the parity of the first and second states each comprises measuring photon number parity modulo 2.

According to some embodiments, measuring the parity of the first and second states each comprises measuring the photon number parity modulo N, where N is an integer greater than 2.

According to some embodiments, application of the first and second drive waveforms is configured to transition the quantum mechanical oscillator from the second state back to the first state without passing through a ground state of the quantum mechanical oscillator.

According to some embodiments, the quantum mechanical oscillator is a microwave cavity.

According to some embodiments, the physical qubit is a transmon qubit.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
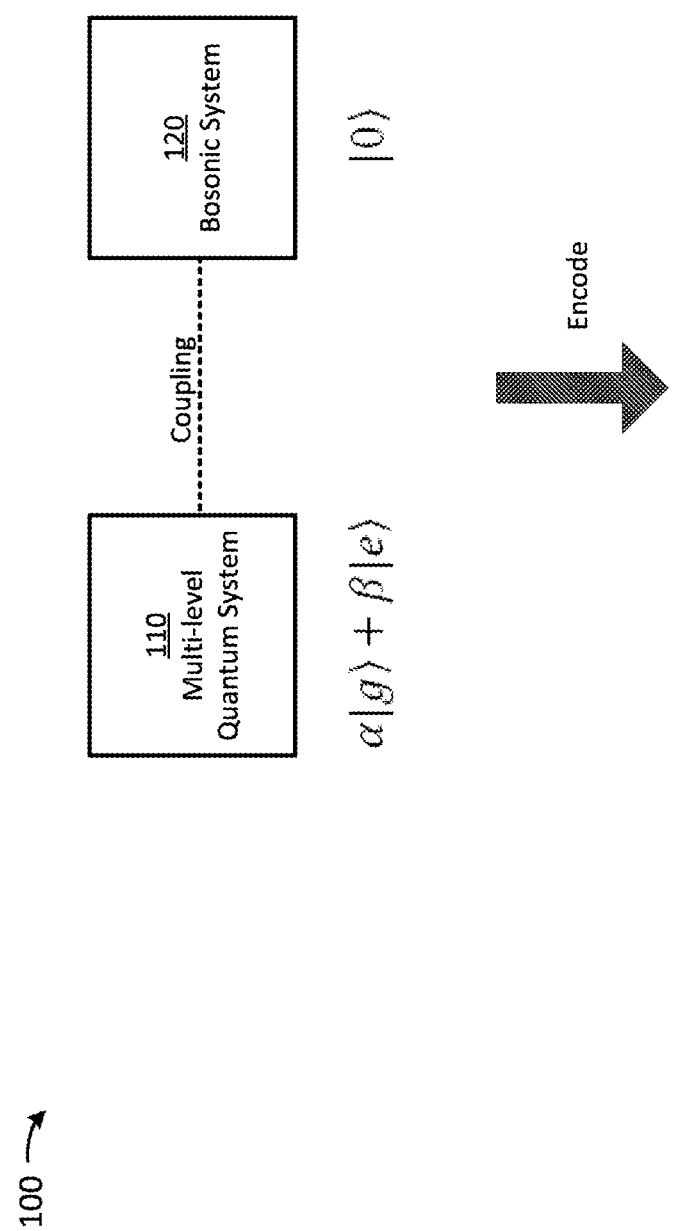
FIGS. 1A-1B illustrate encoding of the state of a multi-level quantum system in a bosonic system, according to some embodiments.

The present application relates to an improved quantum error correction technique for correcting errors in the state of a quantum system exhibiting one or more bosonic modes. An "error" in this context refers to a change in the state of the quantum system that may be caused by, for instance, boson losses, boson gains, dephasing, time evolution of the system, etc., and which alters the state of the system such that the information stored in the system is altered.

As discussed above, quantum multi-level systems such as qubits exhibit quantum states that, based on current experimental practices, decohere in around ~100 µs. While experimental techniques will undoubtedly improve on this and produce qubits with longer decoherence times, it may nonetheless be beneficial to couple a multi-level system to another system that exhibits much longer decoherence times. As will be described below, bosonic modes are particularly desirable for coupling to a multi-level system. Through this coupling, the multi-level system's state may be represented by the bosonic mode(s) instead, thereby maintaining the same information yet in a longer-lived state than would otherwise exist in the multi-level system alone.

Quantum information stored in bosonic modes may nonetheless still have a limited lifetime, such that errors will still occur within the bosonic system. It may therefore be desirable to manipulate a bosonic system when errors in its state occur to effectively correct those errors and thereby regain the prior state of the system. If a broad class of errors can be corrected for, it may be possible to maintain the state of the bosonic system indefinitely (or at least for long periods of time) by correcting for any type of error that might occur.

The fields of cavity quantum electrodynamics (cavity QED) and circuit QED represent one illustrative experimental approach to implement quantum error correction. In these approaches, one or more qubit systems are each coupled to a resonator cavity in such a way as to allow mapping of the quantum information contained in the qubit(s) to and/or from the resonator(s). The resonator(s) generally will have a longer stable lifetime than the qubit(s). The quantum state may later be retrieved in a qubit by mapping the state back from a respective resonator to the qubit.

When a multi-level system, such as a qubit, is mapped onto the state of a bosonic system to which it is coupled, a particular way to encode the qubit state in the bosonic system must be selected. This choice of encoding is often referred to simply as a "code."

As an example, a code might represent the ground state of a qubit using the zero boson number state of a resonator and represent the excited state of a qubit using the one boson number state of the resonator. That is:

$$(\alpha|g\rangle + \beta|e\rangle) \otimes |0\rangle \rightarrow |g\rangle \otimes (\alpha|0\rangle + \beta|1\rangle)$$

where $|g\rangle$ is the ground state of the qubit, $|e\rangle$ is the excited state of the qubit, $\alpha$ and $\beta$ are complex numbers representing the probability amplitude of the qubit being in state $|g\rangle$ or $|e\rangle$, respectively, and $|0\rangle$ and $|1\rangle$ are the zero boson number state and one boson number state of the resonator, respectively. While this is a perfectly valid code, it fails to be robust against many errors, such as boson loss. That is, when a boson loss occurs, the state of the resonator prior to the boson loss may be unrecoverable with this code.

Figure 1B:
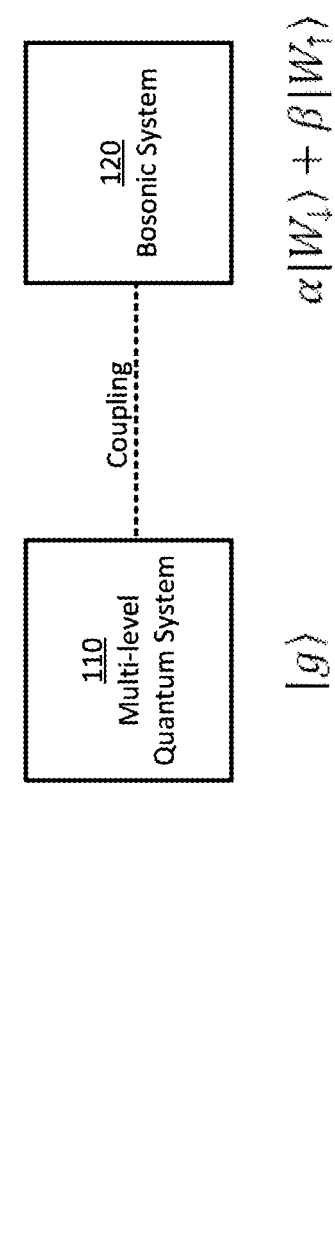

The use of a code can be written more generally as:

$$(\alpha|g\rangle + \beta|e\rangle) \otimes |0\rangle \rightarrow |g\rangle \otimes (\alpha|W_\downarrow\rangle + \beta|W_\uparrow\rangle) \quad (\text{Eqn. 1})$$

where $|W_\downarrow\rangle$ and $|W_\uparrow\rangle$ are referred to as the logical codewords (or simply "codewords"). The choice of a code—equivalently, the choice of how to encode the state of a two-level system (e.g., a qubit) in the state of the bosonic system—therefore includes choosing values for $|W_\downarrow\rangle$ and $|W_\uparrow\rangle$. FIGS. 1A-1B graphically depict this process of encoding for some choice of $|W_\downarrow\rangle$ and $|W_\uparrow\rangle$.

When an error occurs, the system's state transforms to a superposition of resulting states, herein termed "error words," $|E_\downarrow\rangle$ and $|E_\uparrow\rangle$ as follows:

$$\alpha|W_\downarrow\rangle + \beta|W_\uparrow\rangle \rightarrow \alpha|E_\downarrow^k\rangle + \beta|E_\uparrow^k\rangle \quad (\text{Eqn. 2})$$

where the index k refers to a particular error that has occurred. As discussed above, examples of errors include boson loss, boson gain, dephasing, amplitude dampening, etc.

In general, the choice of code affects how robust the system is to errors. That is, the code used determines to what extent a prior state can be faithfully recovered when an error occurs. A desirable code would be associated with a broad class of errors for which no information is lost when any of the errors occurs and any quantum superposition of the logical codewords can be faithfully recovered. Some codes, while robust against certain errors, may however be impractical to realize in a physical system.

The inventors have recognized and appreciated a class of codes that protect against a wide array of errors that can occur in a bosonic system, including boson gain, boson loss, dephasing, and amplitude dampening, and that can be realized experimentally. Codes from this class are referred to herein as "binomial codes," since the class of codes may be described by a binomial distribution, as described below. The inventors have developed techniques for correcting errors when a code from this class is utilized to store a state in a bosonic system. In particular, the inventors have developed unitary operations that may be applied to the bosonic system based upon a detected error. Furthermore, the inventors have recognized and appreciated experimental configurations in which energy may be applied to a bosonic system, such as a cavity resonator, to perform the above-mentioned unitary operations.

According to some embodiments, a binomial code may be used to configure a state of a single mode bosonic system. Bosonic systems may be particularly desirable systems in which to apply the techniques described herein, as a single bosonic mode may exhibit equidistant spacing of coherent states. A resonator cavity, for example, is a simple harmonic oscillator with equidistant level spacing. Bosonic modes are also helpful for quantum communications in that they can be stationary for quantum memories or for interacting with conventional qubits, or they can be propagating ("flying") for quantum communication (e.g., they can be captured and released from resonators). A single bosonic mode in particular may allow for states having lower mean bosonic numbers than states produced by multiple bosonic modes. Since boson loss rate tends to scale with mean boson number, a single bosonic mode will generally have a lower error rate than multiple bosonic modes. Moreover, error correction of a single bosonic mode does not require mode-to-mode entangling operations that would otherwise be needed for multiple bosonic modes. The binomial codes described herein utilize bosonic number states of a single bosonic mode to represent the codewords, as described below.

According to some embodiments, a bosonic system may be used in conjunction with a binomial code to act as a quantum memory device. A multi-level system, such as a qubit, may store one or more quantum bits in a state that will decoherence in a short time scale, as described above. This state may instead be stored in a bosonic system encoded via the selected binomial code. This system will also decoherence, although typically in a longer time scale than that exhibited by the multi-level system. The binomial code may allow for correction of errors that occur to a perfect, or near perfect, degree such that the state of the bosonic system can be maintained. In this manner, the bosonic system acts as a quantum memory with respect to the quantum bit(s) originally stored in the multi-level system. If desired, the state in the bosonic system can be later transferred back to the multi-level system.

According to some embodiments, a detector may be configured to monitor the bosonic system to detect when an error occurs. It is a feature of the binomial codes described herein that such a detector may be able to detect whether any error occurred, and also detect which type of error occurred, whilst preserving the state of the bosonic system. This type of measurement is sometimes referred to as a quantum nondemolition measurement (QND). Not all codes exhibit this feature, as for some codes a detection of an error may yield information on which of the two codewords is a more likely state of the system (recall that a given code stores a state in a quantum superposition of the two selected codewords). This carrying away of information as result of the measurement causes a change in the state of the quantum system.

In contrast, the binomial codes described herein provide for detection of a broad class of errors, where in each case detection does not change the boson number of the state of the system. When a measurement of the bosonic system does not detect an error, however, the backaction of this operation causes amplitude damping of the bosonic mode. Amplitude damping does not change the boson number of the bosonic system, but does change the probabilities of measuring each of the different boson numbers. The binomial codes described herein provide an explicit construction for repumping energy into the bosonic system to recover from amplitude damping, however. Accordingly, whether an error is detected or not, techniques described herein in conjunction with a binomial code allow maintenance of the bosonic system's state via application of a unitary operation to counteract the amplitude dampening effect.

An illustrative example of correcting errors using one of the binomial codes may be instructive. One of the binomial codes uses the following codewords (that is, a bosonic system is encoded in a superposition of the two codeword states as shown in FIGS. 1A-1B):

$$|W_\downarrow\rangle = \frac{1}{\sqrt{2}}\{|0\rangle + |4\rangle\}$$
$$|W_\uparrow\rangle = |2\rangle$$
(Eqn. 3)

Note that, for this pair of codewords, the mean boson number $\bar{n}=2$ for each state. Accordingly, the loss or gain of a boson (for example) does not produce information on which of the two codeword states the photon came from. This preserves the number state of the bosonic system upon detection of the boson loss or gain.

If this bosonic system were to lose a boson (e.g., due to energy loss), it would be transformed as follows:

$$a|W_\downarrow\rangle = |E_\downarrow^1\rangle = \sqrt{2}|3\rangle$$
$$a|W_\uparrow\rangle = |E_\uparrow^1\rangle = \sqrt{2}|1\rangle$$

where a is the annihilation operator.

One way to think about this transformation is that, if the system were in the $|W_\downarrow\rangle$ state, which is a superposition of $|0\rangle$ and $|4\rangle$, clearly a lost boson must have come from the $|4\rangle$ state and not the ground state. As such, the resulting state would be the $|3\rangle$ state. Similarly, if the system were in the $|W_\uparrow\rangle$ state, which is the $|2\rangle$ state, the resulting state after boson loss would be the $|1\rangle$ state.

If the bosonic system were a photonic system, one way to detect the photon loss would be to detect the photon exiting the system using a photodetector. In many experimental configurations, however, this may be difficult or impractical to perform. As such, another way to detect boson loss is to examine the parity (odd or even boson number state). Before the error, both codeword states would produce even parity, since all of the boson number states of those codewords are even parity states. After the boson loss, the parity would be odd, irrespective of the particular superposition of error word states, since both have odd parity. This is an example of a measurement that, as described above, does not alter the bosonic number state of the system, since the information that is carried away is that a boson was lost, yet this information is provided without including any information on which of the codeword states the system is in.

Once the boson loss has been detected, the system can be driven to the previous state by applying a unitary operation that performs the following transformation:

$$|3\rangle \rightarrow |W_\downarrow\rangle$$
$$|1\rangle \rightarrow |W_\uparrow\rangle$$
(Eqn. 4)

A system configured to have universal control over the quantum state of a system, examples of which are discussed below, can be operated to perform this type of state transformation. One reason the binomial codes allow for this type of correction is that the error words (e.g., $|3\rangle$ and $|1\rangle$ in the above example) for a binomial code are orthogonal. Therefore, a conditional unitary operation can be applied to transform the error word states into the corresponding codeword states irrespective of which of the error word states the system was in.

Figure 2:
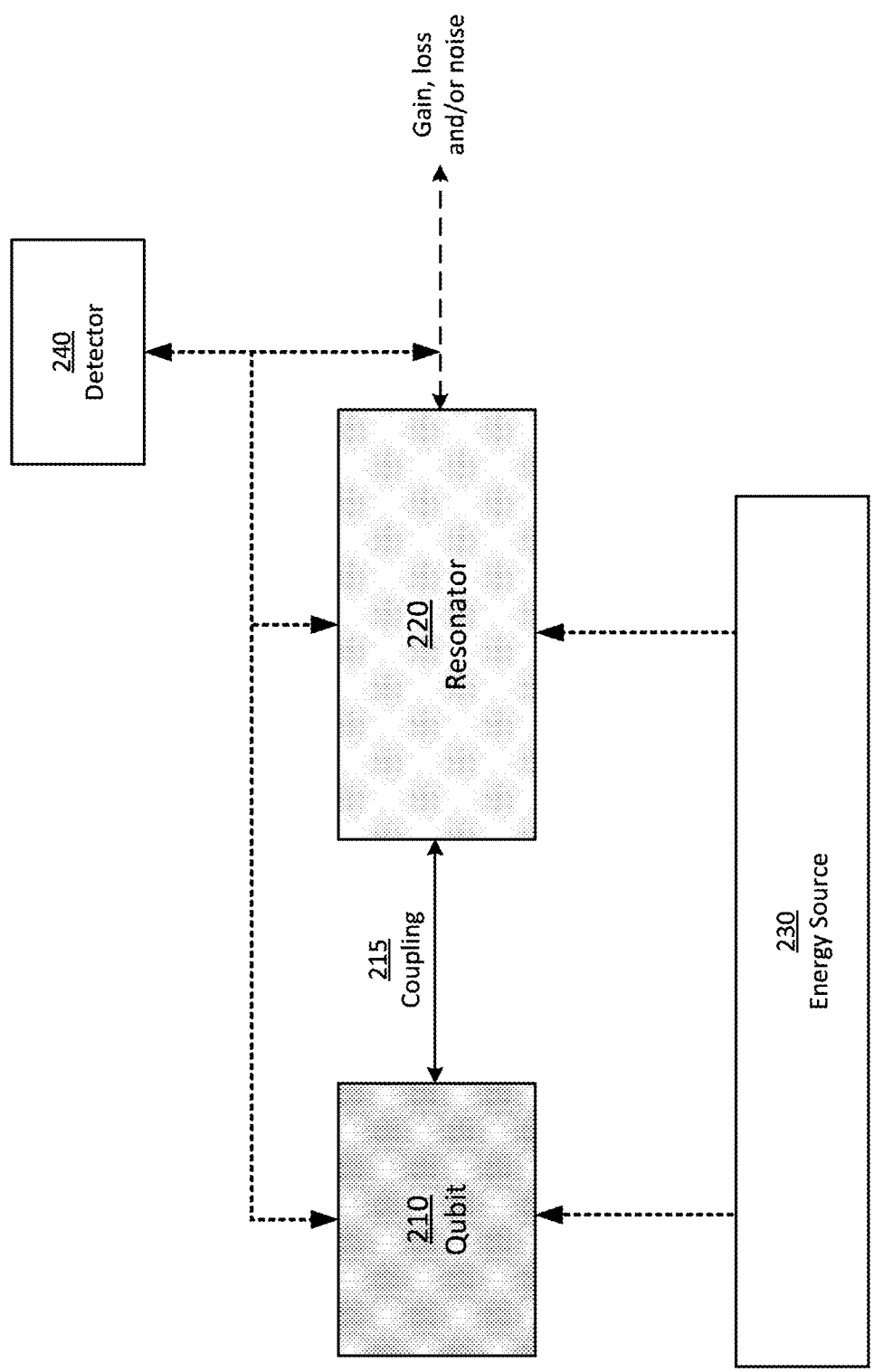
FIG. 2 depicts an illustrative system suitable for practicing aspects of the present application.

FIG. 2 depicts an illustrative system suitable for practicing aspects of the present application. In system 200, qubit 210 is coupled to a resonator 220 via coupling 215. The resonator may lose or gain energy (e.g., lose or gain bosons), may dephase, etc. and in the process may gain or lose energy as shown in the figure. Energy source 230 may supply energy to one or both of qubit 210 and resonator 220 in order to perform operations on the system such an encoding the state of the qubit in the resonator, encoding the state of the resonator in the qubit, applying unitary operations to the resonator (e.g., to correct an error detected in the resonator), applying unitary operations to the qubit, or combinations thereof.

It will be appreciated that any multi-level quantum system coupled to a bosonic system may be utilized with the binomial codes, as discussed above, but system 200 is provided as one illustrative system in which a qubit is coupled to a resonator. A mode of the resonator provides the bosonic mode in this example.

System 200 also includes detector 240 which may be operated to detect the occurrence of an error in the resonator 220. A number of suitable approaches may be employed to operate such a detector, which may measure energy gain and/or loss from the resonator, may interact with the qubit 210 (e.g., may apply one or more unitary operations to the qubit and/or may measure the state of the qubit), and/or may interact with the resonator 220 (e.g., may apply one or more unitary operations to the resonator and/or may measure the state of the resonator). Any combination of such operations may obtain sufficient information about the qubit-resonator system to determine whether an error has occurred in the resonator 220. In some embodiments, detector 240 applies one or more unitary operations to the qubit 210 and/or the resonator 220 by application of energy from energy source 230.

According to some embodiments, the detector 240 comprises a photodetector or other particle detector configured to detect particles entering and/or exiting the resonator 220. According to some embodiments, detector 240 may perform a sequence of operations to measure one or more of parity mod 2, parity mod 3, parity mod N, etc. of the state of the resonator. As discussed below, such measurements may indicate whether boson losses or gains have occurred. Illustrative techniques for performing parity measurements in a qubit-resonator system are described, for example, in International Application No. PCT/US2016/043514, titled "Techniques of Oscillator State Manipulation for Quantum Information Processing and Related Systems and Methods," filed on Jul. 22, 2016, which is incorporated herein by reference in its entirety.

Qubit 210 may include any suitable quantum system having two distinct states, such as but not limited to, those based on a superconducting Josephson junction such as a charge qubit (Cooper-pair box), flux qubit or phase qubit, or combinations thereof. The qubit 210 may be coupled to the resonator 220 via coupling 215 which couples the state of the qubit to the state of the resonator. The resonator 220 may include any resonator supporting one or more bosonic modes, which may be implemented using any electromagnetic, mechanical, magnetic (e.g., quantized spin waves also known as magnons), and/or other techniques, such as but not limited to any cavity resonator (e.g., a microwave cavity). According to some embodiments, resonator 220 may be a transmission line resonator.

As an illustrative embodiment, qubit 210 may be a charge qubit coupled to a superconducting transmission line cavity (an example of resonator 220) comprising a central conductor and ground planes on either side of the conductor separated by a length selected based upon the wavelength of photons trapped in the cavity. For instance, the length of the resonator may be a multiple of one half of such a wavelength. A length of the transmission line may also be selected based upon a desired impedance of the transmission line. According to some embodiments, a transmission line may have a length between 1 m and 100 μm, such as between 5 μm and 50 μm, such as 10 μm. According to some embodiments, a transmission line may have a length between 5 mm and 50 mm, such as between 10 mm and 30 mm, such as 25 mm. The qubit may interact with the electric fields in the transmission line such that an adjustment to the state of the qubit causes an adjustment in the state of the resonator.

Coupling 215 may utilize any technique(s) to couple the qubit and the resonator, such as by coupling the electric and/or magnetic fields generated by the qubit and the resonator. According to some embodiments, the qubit and the resonator may be dispersively coupled via the coupling 215. According to some embodiments, the qubit (e.g., a transmon) may be coupled to the resonator, being a mechanical resonator, via a piezoelectric coupling. According to some embodiments, the qubit may be coupled to the resonator, being a magnetic resonator, by coupling the qubit (e.g., a transmon) to phonons, which in turn couple to magnons via magnetostrictive coupling.

The system of FIG. 2 may be used in at least the following two use case scenarios. First, resonator 220 may be used as a memory to store the state of qubit 210. The state of the resonator may be error-corrected using the techniques described herein. Subsequently, the state may be mapped to qubit 210 and/or any other qubit. Second, the resonator 220 may be used as a transmission medium to transport the state of qubit 210 to another qubit, along a transmission line, and/or to another resonator. The state of the resonator during transmission may be error-corrected using the techniques described below. Subsequently, the state may be mapped to a target of the transmission. In each of these use cases, and in any other suitable use of the system 200, a state may be represented in the resonator 220 using one of the binomial codes. Furthermore, the energy source 230 may apply energy to the qubit and/or the resonator to correct errors based on the selected binomial code, as described in further detail below.

As discussed above, quantum error correction comprises selecting logical codewords with which to represent a state, such as the state of a qubit. These codewords are states embedded in a large Hilbert space, such as the space of a harmonic oscillator, such that no information is lost if any one of the single, independent error $\hat{E}_k \in \varepsilon$ occurs and any quantum superposition of the logical codewords $|W_\sigma\rangle$, where $\sigma = \uparrow, \downarrow$, can be faithfully recovered. This is equivalent to finding two logical codewords that satisfy the quantum error correction criteria, known also as the Knill-Laflamme conditions:

$$\langle W_\sigma | \hat{E}_l^\dagger \hat{E}_k | \omega_{\sigma'} \rangle = \alpha_{lk} \delta_{\sigma\sigma'}, \quad \text{(Eqn. 5)}$$

for all $\hat{E}_{l,k} \in \varepsilon$ (where ε is the set of correctable errors for the code) such that $\alpha_{kl}$ are entries of a Hermitian matrix and independent of the logical words. The diagonal entries $\alpha_{kk}$ are the probabilities of the errors $\hat{E}_k$. The independence of entries $\alpha_{kl}$ from the logical codewords and the structure of the non-diagonal entries cause the different errors to be distinguishable and correctable.

The structure of the binomial codes is developed and described in further detail in Appendix A below. In system 200, a binomial code may be used to encode the state of the resonator 220 based on the state of the qubit 210. Techniques for universal control may be applied to produce a superposition of the codeword states in the resonator based on the superposition of the ground and excited states present in the qubit, as shown in FIGS. 1A-1B. For instance, techniques described in the above-referenced International Application No. PCT/US2016/043514 describe techniques suitable for encoding the state of the qubit into the state of the resonator in system 200. As discussed above, in general such techniques may comprise operating energy source 230 to apply energy in a sequence of steps, wherein each step comprises application of energy to the qubit 210, to the resonator 220, or simultaneously to both the qubit and resonator.

For example, the encoding of a qubit state into a resonator state, as show in FIGS. 1A-1B, may be achieved as follows. Beginning with the state shown in FIG. 1A, with the resonator in the ground state (zero bosons), drive pulses are simultaneously applied to the qubit 210 and the resonator 220, which excite the bosonic mode while ultimately returning the qubit to the ground state. If the qubit 210 is initially in the ground state $|g\rangle$, the drive pulses excite the bosonic mode 220 to state $|W_\uparrow\rangle$ but ultimately return the qubit 210 to its ground state. If the qubit 210 is initially in the excited state $|e\rangle$, the drive pulses excite the bosonic mode to state $|W_\uparrow\rangle$ while driving the qubit 210 back to its ground state $|g\rangle$. In other words, the final state of the bosonic mode 220 is conditioned on the initial state of the qubit 210. Put another way, these drive pulses carry out the unitary state transfer operation:

$$U = |g\rangle|W_\downarrow\rangle\langle 0|g|+|g\rangle|W_\uparrow\rangle\langle 0|\langle e|+|g\rangle|0\rangle$$
$$\langle W_\downarrow|\langle g|+|e\rangle|0\rangle\langle W_\uparrow|\langle g|+U_{rest}$$

where the remaining terms $U_{rest}$ of the unitary operation are irrelevant to the particular unitary state transfer operation. The freedom to choose $U_{rest}$ may be used to vary the applied drive pulses to optimize the fidelity of the state transfer operation.

According to some embodiments, the binomial codes may protect against up to L boson loss events occurring in the time interval dt between two consecutive quantum correction stages. Consider the set of discrete errors $\bar{\varepsilon} = \{1, \hat{a}, \hat{a}^2 \ldots \hat{a}^L\}$, where a is the annihilation operator, and "1" is the identity operator and represents no error.

Although protection against boson loss errors will be initially discussed, this will be generalized below to codes that are designed to also protect against boson gain $\hat{a}^\dagger$, dephasing errors $\hat{n}$, and amplitude damping. As used herein, a code that "protects" against a particular error means that the code is such that, when the error occurs, the previous state is recoverable via one or more unitary operations.

As discussed above, one example of a code protecting against $\bar{\varepsilon}_1 = \{1, \hat{a}\}$ (either no error or the loss of a single boson) is $$W_\uparrow = \frac{|0\rangle + |4\rangle}{\sqrt{2}}, \quad W_\downarrow = |2\rangle. \quad \text{(Eqn. 6)}$$

A boson loss error brings the logical codewords $|W_\downarrow\rangle$ and $|W_\uparrow\rangle$ to a subspace with odd boson numbers that is disjoint from the even-parity subspace of the logical codewords and therefore, the off-diagonal parts of the QEC matrix α in (Eqn. 5) are identically zero. The remaining diagonal part of α indicates that the mean boson number is identical for both of the states, here $\bar{n}=2$, meaning that the probability of a boson jump to occur or not to occur is equally likely for both of the states implying that the quantum state is not deformed under an error. Explicitly, if a quantum state $|\psi\rangle = \alpha|W_\uparrow\rangle + \beta|W_\downarrow\rangle$ suffers a boson jump, it is transformed to $|\psi'\rangle = \hat{a}|\psi\rangle/\sqrt{\langle\psi|\hat{a}^\dagger\hat{a}|\psi\rangle} = \alpha|E_\uparrow^1\rangle + \beta|E_\downarrow^1\rangle$, where the error words are $|E_\uparrow^1\rangle = |3\rangle$ and $|E_\downarrow^1\rangle = |1\rangle$, and $\hat{a}^\dagger$ and $\hat{a}$ are the creation and annihilation operators, respectively.

An example of a code protecting against $\bar{\varepsilon}_2 = \{1, \hat{a}, \hat{a}^2\}$ is:

$$|W_\uparrow\rangle = \frac{|0\rangle + \sqrt{3}|6\rangle}{2}, |W_\downarrow\rangle = \frac{\sqrt{3}|3\rangle + |9\rangle}{2}. \quad \text{(Eqn. 7)}$$

For this code, in addition to the codewords having the same mean boson number, the error words $|\bar{E}_o^1\rangle = \hat{a}|W_o\rangle/\sqrt{\langle W_o|\hat{a}^\dagger\hat{a}|W_o\rangle}$, $|E_\uparrow^1\rangle = |5\rangle$ and $|E_\downarrow^1\rangle = (|2\rangle + |8\rangle)/\sqrt{2}$ have the same mean boson number. In contrast, the code of (Eqn. 6) has codewords with the same mean boson number but, upon loss of a boson, the error words have different mean boson numbers. In view of this, the code of (Eqn. 7) can tolerate another boson loss error and the protected error set is $\bar{\varepsilon} = \{1, \hat{a}, \hat{a}^2\}$. For this case, the boson loss errors can be detected by measuring boson number mod 3. The error recovery procedure is similar as above: an error detection is followed by a unitary operation performing a state transfer $|W_o\rangle \leftrightarrow |E_o^k\rangle$. As shown in Appendix A, a family of codes can be developed that protect against any arbitrary number of boson loss errors L.

In system 200, another error that might occur is dephasing of the resonator 202 due to frequency fluctuations of the resonator (e.g., noise coupling to the boson number $\hat{n}$, for example caused by transitions of the coupled qubit 201). The inventors have recognized that the code of (Eqn. 7) also protects also against a dephasing error $\hat{n}$, and thus the full error set is $\bar{\varepsilon}_2 = \{1, \hat{a}, \hat{a}^2, \hat{n}\}$. Since a dephasing error does not change the boson number, it leads to an error state $|\psi'\rangle = \hat{n}|\psi\rangle/\sqrt{\langle\psi|\hat{n}^2|\psi\rangle}$, $$|\psi'\rangle = \alpha\frac{\sqrt{3}|W_\uparrow\rangle - |\bar{E}_\uparrow^n\rangle}{2} + \beta\frac{\sqrt{3}|W_\downarrow\rangle - |\bar{E}_\downarrow^n\rangle}{2}. \quad \text{(Eqn. 8)}$$

which is a superposition of the original words and the error words related to the dephasing $|\bar{E}_\uparrow^n\rangle = (\sqrt{3}|0\rangle - |6\rangle)/2$ and $|\bar{E}_\downarrow^n\rangle = (|3\rangle - \sqrt{3}|9\rangle)/2$. One way to detect the dephasing error is to apply unitary operations that produce projective measurements into the logical word basis $\hat{P}_W = \Sigma_o |W_o\rangle\langle W_o|$, and if the answer is negative (and no boson loss errors were detected) dephasing is detected. The original state can then be recovered by making a unitary operation performing a state transfer $|\bar{E}_o^n\rangle \leftrightarrow |W_o\rangle$.

The code of (Eqn. 7) can instead be chosen to protect against errors $\bar{\varepsilon}'_2 = \{1, \hat{a}, \hat{a}^\dagger, \hat{n}\}$ (=no error, single boson loss, single boson gain, dephasing) since a boson addition error and two boson loss errors have the same change in the boson number mod 3, and the logical code words already obey the QEC condition for the boson gain error: $\langle W_o|\hat{a}\hat{a}^\dagger|W_{o'}\rangle = (\bar{n}+1)\delta_{oo'}$. As a special case, one can choose to protect only against $\varepsilon'_1 = \{1, \hat{a}, \hat{n}\}$ achieved by the same Fock state coefficients as with the code (Eqn. 7) but with spacing of the code (Eqn. 6):

$$|W_\uparrow\rangle = \frac{|0\rangle + \sqrt{3}|4\rangle}{2}, W_\downarrow = \frac{\sqrt{3}|2\rangle + |6\rangle}{2}, \quad \text{(Eqn. 9)}$$

It may be noted that the broader the class of error for which a code protects against, the larger the error rates are, as codes involve higher Fock states the broader the class becomes and higher Fock states produce more errors.

The above codes can be generalized to protect against the error set that includes up to L boson losses; up to G boson gain errors; and up to D dephasing events:

$$\bar{\varepsilon} = \{1, \hat{a}, \hat{a}^2, \ldots, \hat{a}^L, \hat{a}^\dagger, \ldots, (\hat{a}^\dagger)^G, \hat{n}, \hat{n}^2, \ldots, \hat{n}^D\}. \quad \text{(Eqn. 10)}$$

Figure 6:
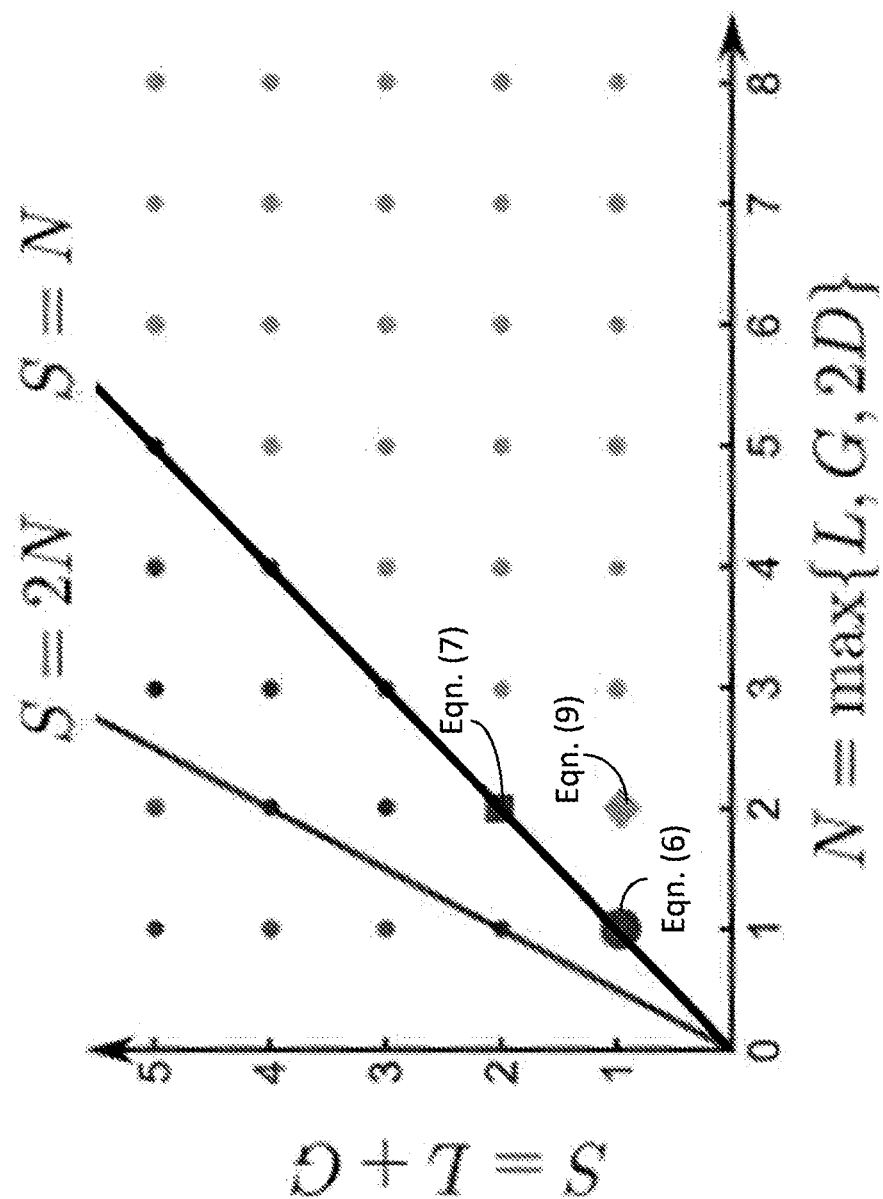
FIG. 6 illustrates a two-parameter (N, S) space of binomial quantum error correction codes, according to some embodiments.

The inventors have recognized that a class of codes which can correct for errors arising from this error set are:

$$|W_{\uparrow/\downarrow}\rangle = \frac{1}{\sqrt{2^N}} \sum_{p\,even/odd}^{N+1} \sqrt{\binom{N+1}{p}} |p(S+1)\rangle, \quad \text{(Eqn. 11)}$$

where $S = L+G$ and $N = \max\{L, G, 2D\}$. For example, Eqn. 11 with the values $L=1$, $G=0$ and $D=0$ produces the codewords of Eqn. 6. These codes have been referred to herein as "binomial codes" because the state amplitudes involve binomial coefficients (which, it should be noted, are independent of the spacing S). The two-parameter (N, S) code space of Eqn. 11 is shown in FIG. 6. To apply the error correction techniques described herein, a bosonic system that has a state encoding a two-level system may use any pair of codewords given by Eqn. 10 (i.e., for any combination of values of L, G and D) to describe the two level system; that is, the bosonic system may have a state $\alpha|W_\downarrow\rangle + \beta|W_\uparrow\rangle$ where $|W_\downarrow\rangle$ and $|W_\uparrow\rangle$ are given by Eqn. 11 for some combination of values of L, G and D.

It will be noted that the binomial codes operate in a restricted Hilbert space, which could be beneficial for the practical construction of the unitary operators required for error diagnosis and recovery. This may particularly apply to errors involving $\hat{a}^\dagger$ operators, whose operation on conventional codes may be less straightforward than $\hat{a}$ operators alone.

Although Eqn. 11 represents a class of codes with which to represent a two-level system (e.g., a qubit), the inventors have also developed codes that can be used to represent a d-level system (a so-called 'quantum digit,' or 'qudit') and therefore have d logical codewords. These codes utilize multinomial coefficients, rather than binomial coefficients, and are described in Appendix A.

Returning to FIG. 2, the codes selected from the above-described class of binomial codes may be used to represent the state of qubit 210 in the resonator 220. Once an error occurs in the resonator, the error may be detected and operations may be performed to correct the error. The error-correction process is described in detail below with respect to FIG. 3.

Figure 3:
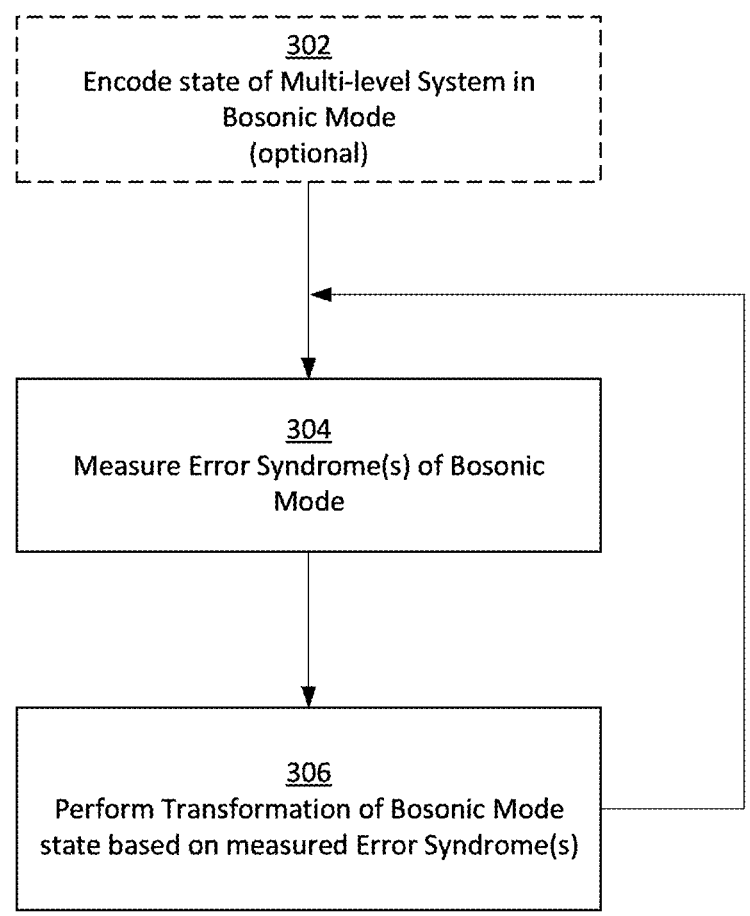
FIG. 3 is a flowchart of a method of correcting errors that occur within a bosonic system, according to some embodiments.

FIG. 3 is a flowchart of a method of correcting errors that occur within a bosonic system, according to some embodiments. FIG. 3 may be performed within system 200 shown in FIG. 2, for example. Method 300 includes steps of measuring an error syndrome of a bosonic system and performing a correction based on the measured error syndrome. Method 300 also includes an optional initial step in which the bosonic mode's state is encoded based on a coupled multi-level system.

Method 300 can optionally begin in act 302 in which the state of a multi-level system is encoded in the state of a bosonic mode. In the case where the multi-level system is a qubit, this encoding may utilize any code selected from the above-described binomial codes to represent the state of the qubit in the bosonic mode. Alternatively, if the multi-level system is a qudit, this encoding may utilize any code selected from the multinomial codes described in Appendix A to represent the state of the qubit in the bosonic mode. Any suitable technique may be applied to encode the state of a multi-level system in a bosonic mode, examples of which are described above.

Alternatively, method 300 may begin in act 304 wherein a bosonic mode has been previously configured with a state that is a superposition of a pair of codewords selected from the class of binomial codes or class of multinomial codes. Accordingly, irrespective of whether method 300 includes the optional encoding act 302, prior to act 304 the bosonic mode is in a state that is a superposition of a pair of codewords selected from the class of binomial codes or class of multinomial codes. For example, if the bosonic mode of method 300 represents a two-level system, it has a state that is a superposition of one of the pairs of codewords given by Eqn. 11.

In act 304, an error syndrome of the bosonic mode is measured. An "error syndrome" as used herein refers to a measurement that is indicative that a particular error (or one of a group of particular errors) has occurred. One example of an error syndrome discussed above is a measurement that shows there has been a change in parity of the bosonic number state of the bosonic mode (or parity mod 3, parity mod 4, etc.). Another error syndrome is a measurement that indicates dephasing has occurred (an example of this type of measurement is discussed above). Another error syndrome is a measurement that indicates no error has occurred. Since the act of measuring the bosonic mode can cause amplitude damping of the mode, a measurement indicating no error has occurred may nonetheless lead to action based on this measurement, and therefore "no error" is also considered an error syndrome.

According to some embodiments, detecting a boson loss or gain error in act 304 may comprise a sequence of operations in which energy is applied to the bosonic mode directly and/or to another system to which the bosonic mode is coupled. For example, in a system comprising a resonator (e.g., microwave cavity) with a strong dispersive coupling to a qubit, where the strength of the dispersive coupling is stronger than the decay rates of the qubit and the resonator, the qubit can be driven conditioned on given boson number states of the resonator. The electromagnetic pulse applied to the qubit can be selected such that, for example, the qubit will be in a particular state after application of the pulse that depends upon the boson number state of the resonator. Measurement of the qubit then indicates the parity of the coupled resonator. According to some embodiments, a measurement of boson number mod (S+1) comprises performing S sequential measurements of the two-level qubit.

According to some embodiments, detection of a dephasing error in act 304 may be made by projective measurements $P_d = \Sigma_\sigma |E_\sigma^d\rangle\langle E_\sigma^d|$, for d=0, 1, ..., N. Here, $|E_\sigma^d\rangle$ are linear combinations of $\{n^l |W_\sigma\rangle\}_{l=0, 1, ..., N}$ that satisfy the orthonormal condition:

$$\langle E_\sigma^d | E_{\sigma'}^{d'}\rangle = \delta_{d,d'}\delta_{\sigma,\sigma'}$$

for d, d'=0, 1, ..., N. Similar to the detection of boson gain or loss errors, the detection of a dephasing error may comprise a sequence of operations in which energy is applied to the bosonic mode directly and/or to another system to which the bosonic mode is coupled.

For example, in a system comprising a resonator (e.g., microwave cavity) with a strong dispersive coupling to a qubit, electromagnetic pulses applied to the resonator and qubit can be selected such that, after application of the pulse(s), the qubit will be in a particular state that depends on the resonator being in the subspace spanned by $\{|E_\uparrow^d\rangle, |E_\downarrow^d\rangle\}$ for some d. Measurement of the qubit would then indicate whether the oscillator is in the subspace spanned by $\{|E_\uparrow^d\rangle, |E_\downarrow^d\rangle\}$ or not. If the oscillator is found to be within this subspace, one or more electromagnetic pulses (which may be, for example, pre-computed) can be applied to the system to carry out unitary state transfer from $|E_\uparrow^d\rangle$ to $|W_\uparrow\rangle$, and from $|E_\downarrow^d\rangle$ to $|W_\downarrow\rangle$.

According to some embodiments, a measurement of $\hat{P}_d$ for d=0, 1, ..., N may comprise performing N+1 sequential measurements of a two-level qubit.

According to some embodiments, act 304 comprises detection of "no error," also referred to herein as a "no-jump error." As discussed above, there can be a measurement backaction produced upon the bosonic mode as a result of observing no change in the boson number state. This backaction reduces the relative probability of the higher Fock states with respect to the lower ones, formally expressed with the factor $\exp(-\kappa dt \hat{n}/2)$ in the error operators (see Eqn. 14 below). Correction of this error syndrome is discussed below.

In act 306, one or more operations are performed upon the bosonic mode to transform its state based on the error syndrome detected in act 304. This transformation is configured to counteract the error implied by the measured error syndrome—that is, to attempt to transition the system back to the state it was in prior to the error. In some, but not all, cases, this transformation can be exact. In other cases, the transformation may approximately return the system to its previous state.

According to some embodiments, act 306 may apply the one or more operations based on an analysis of a bosonic mode that evolves over time. For example, the standard Lindblad time evolution of a density matrix $\hat{\rho}$ of a cavity coupled to a zero-temperature bath with a cavity energy decay rate $\kappa$ is (represented in the frame rotating at the cavity frequency)

$$\frac{d\hat{\rho}}{dt} = \frac{\kappa}{2}(2\hat{a}\hat{\rho}\hat{a}^\dagger - \hat{a}^\dagger\hat{a}\hat{\rho} - \hat{\rho}\hat{a}^\dagger\hat{a}). \qquad \text{(Eqn. 12)}$$

In a finite time interval dt, continuous time evolution results in an infinite set of errors and exact quantum error correction of the full set of errors is not possible. However, the probabilities of the errors scale with powers of $\kappa dt$ and we can choose to correct only the most important errors in $\kappa dt$. Formally, we exploit the notion and theory of the field of approximate quantum error correction (AQEC). Roughly speaking, each error operator is expanded in powers of $\kappa dt$ and the errors corrected up to a given highest order of the expansion. To be consistent with choosing to correct only the errors that occur with probabilities to a specified highest order in $\kappa dt$, it may be enough to satisfy the QEC criteria of Eqn. 5 only approximately such that the resulting recovery of the original state has an accuracy given by the same highest order in $\kappa dt$.

Consider initially only amplitude damping by boson loss errors, that is, the time-evolution of Eqn. 12, and extend the discussion for boson gain and dephasing processes later. One can 'unravel' the Lindblad Equation (Eqn. 12) by considering the conditional quantum evolution of the system based on the measurement record of a photomultiplier that clicks whenever a boson is lost. In this quantum trajectory picture, one views the first term in Eqn. 12 representing the boson loss jump of the system when the detector clicks $\hat{\rho} \to \hat{a}\hat{\rho}\hat{a}^\dagger$. This is not normalized because it includes the fact that the click probability is proportional to $\text{Tr}(\hat{a}\hat{\rho}\hat{a}^\dagger) = \bar{n}$. The last two terms inside the brackets represent time-evolution of the system under an imaginary non-Hermitian Hamiltonian $$\hat{V}/\hbar = -i\frac{\kappa}{2}\hat{a}^\dagger \hat{a}$$

when no bosons are detected. Above when considering an idealized error set $\bar{\varepsilon}_L = \{1, \hat{a}, \hat{a}^2, \ldots, \hat{a}^L\}$ we for simplicity ignored a part of the physical error process, namely this no-jump evolution occurring inbetween boson loss jumps. Much like a Feynman path integral, we can express the evolution of the density matrix from time 0 to t in terms of a sum over all possible trajectories with jumps occurring at all possible times during the time interval t:

$$\hat{\rho}(t) = \sum_{\ell=0}^{\infty} \hat{\rho}_\ell(t) = \sum_{\ell=0}^{\infty} \hat{E}_\ell \hat{\rho}(0) \hat{E}_\ell^\dagger, \quad \text{(Eqn. 13)}$$

where $\hat{E}_\ell$ are Kraus operators encapsulating the time-evolution generated by exactly 1 boson losses and the no-jump evolution in between the boson loss events. By integrating over all the possible jump times of exactly 1 boson jumps during the time interval t we can derive an analytic expression for $\hat{E}_\ell$:

$$\hat{E}_\ell = \sqrt{\gamma_\ell} e^{-\frac{\kappa dt}{2}\hat{n}} \hat{a}^\ell = \sqrt{\gamma_\ell e^{\kappa \kappa dt}} \hat{a}^\ell e^{-\frac{\kappa dt}{2}\hat{n}}, \quad \text{(Eqn. 14)}$$

where $\gamma_\ell = (1-e^{-\kappa t})^\ell/\ell!$ (see Appendix B). A noteworthy feature of the damped simple harmonic oscillator is that the precise timing of the boson jumps plays no role. This can also be seen in the interchangeability of the order of the operators in Eqn. 14. If a self-Kerr non-linearity is present, the precise timing of the jumps matters and tracing over them leads to dephasing. Taken together, when correcting against boson loss errors up to order $(\kappa dt)^L$, the correct set of errors the codes should be protected against is $\varepsilon_L = \{\hat{E}_0, \hat{E}_1, \ldots, \hat{E}_L\}$ including contributions of both the jump and no-jump parts of the non-unitary time-evolution.

According to some embodiments, in act 306 where the error syndrome measured in act 304 indicated loss or gain of one or more bosons, the transformation applied in act 306 is configured to transition the bosonic mode from a state that is a superposition of error word states back to the superposition of codeword states that the mode previously exhibited (e.g., produce the state transitions given by Eqn. 4).

According to some embodiments, this transformation may be performed by application of a correction unitary $\hat{U}_k$ to the bosonic mode to perform a state transfer between the logical codewords and the error words. Errors $\hat{B}_k$ may be recovered to the accuracy of $(\kappa dt)^M$ by a recovery process R chosen to recover the errors $\hat{B}_k$, where the set of errors $\hat{E}_k$:

$$\hat{E}_k = \hat{B}_k + \hat{C}_k + O\left[(\kappa dt)^{\frac{2M+1}{2}}\right]$$

is split to two parts, where $$\hat{B}_k = \sum_{\mu=0}^{M} \hat{E}_{\mu k} \kappa dt^{\frac{\mu}{2}}, \hat{C}_k = \sum_{\mu=M+1}^{2M} \hat{E}_{\mu k} (\kappa dt)^{\frac{\mu}{2}}. \quad \text{(Eqn. 15)}$$

The Kraus operators of the recovery process R can be written as $$\hat{R}_k = \beta_{kk} \Sigma_\sigma |W_\sigma\rangle \langle W_\sigma | \hat{B}_k = \hat{U}_k \hat{P}_k$$

where the error detection is projected to the error subspace, $\hat{P}_k = \Sigma_\sigma \hat{B}_k |W_\sigma\rangle \langle W_\sigma | \hat{B}_k^\dagger$, and the correction unitary $\hat{U}_k = \Sigma_\sigma |W_\sigma\rangle \langle W_\sigma | \hat{B}_k^\dagger$ performs state transfer between the logical codewords and the error words.

For example, the unitary operation for correcting a single boson loss error is:

$$U_1 = |W_\downarrow\rangle \langle 3| + |W_\uparrow\rangle \langle 1| + |3\rangle \langle W_\downarrow| + |1\rangle \langle W_\uparrow|.$$

According to some embodiments, where the bosonic mode is a mode of a resonator (e.g., resonator 220 shown in FIG. 2), correction unitary $\hat{U}_k$ may be applied to the resonator by an energy source supplying energy (e.g., a time-varying electromagnetic pulse) to the resonator and/or to a qubit to which the resonator is coupled (e.g., as described below in relation to FIG. 5). In at least some cases, a plurality of operations may be performed to apply correction unitary $\hat{U}_k$ to the resonator. Such operations may comprise one or more steps in which energy (e.g., a time-varying pulse) is applied to the qubit, to the resonator, or to the qubit and the resonator simultaneously.

According to some embodiments, in act 306 where the error syndrome measured in act 304 indicated one or more dephasing errors, the transformation applied in act 306 is configured to recover the state prior to dephasing by performing a state transfer between the subspaces of the error and logical codewords (e.g., produce the state transitions given by Eqn. 4). In the event of a dephasing error, the operator $\hat{n}$ takes the state to a superposition of the logical codewords and an orthogonal set of errors words, as in Eqn. 8. This event can be diagnosed and the quantum state restored by a projective measurement followed by a conditional unitary operation.

According to some embodiments, in act 306 where the error syndrome measured in act 304 indicated a no jump error syndrome, the transformation applied in act 306 is configured to recover a state prior to when the measurement was made.

According to some embodiments, when the error syndrome measured in act 304 indicated a no lump error syndrome (e.g., no boson loss was detected), the quantum state $|\psi\rangle = \alpha|W_\uparrow\rangle + \beta|W_\downarrow\rangle$ transforms to $$|\psi'\rangle = \hat{E}_0|\psi\rangle/\langle\psi|\hat{E}_0^\dagger \hat{E}_0|\psi\rangle^{\frac{1}{2}}$$

under the no-jump evolution given by $\hat{E}_0 = \exp(-\kappa dt\hat{n}/2)$. The code of Eqn. 6 is protected against the single boson loss error that occurs with probability $P_1 = \langle \hat{E}_1^\dagger \hat{E}_1 \rangle \approx \bar{n}\kappa dt + O[(\kappa dt)^2]$.

Thus, according to some embodiments the no-jump evolution can be determined to the same accuracy:

$$|\psi'\rangle \approx \left[1 - \frac{\kappa dt}{2}(\hat{n} - \bar{n})\right]|\psi\rangle + O[(\kappa dt)^2] \quad \text{(Eqn. 16)}$$
$$= \alpha(|W_\uparrow\rangle + \kappa dt|E_\uparrow^0\rangle) + \beta|W_\downarrow\rangle + O[(\kappa dt)^2],$$

where $|E_\uparrow^0\rangle = (|0\rangle - |4\rangle)/\sqrt{2}$ is the error word associated with the no-jump evolution. Note that $|W_\downarrow\rangle = 2$ is unaffected by the no-jump evolution as its excitation number is equal to the mean boson number. To the first order in $\kappa dt$, the no-jump evolution causes deterministic rotation inside the subspace $\{|W_\uparrow\rangle, |E_\uparrow^0\rangle\}$. By applying a unitary operation, $$\hat{U}_0 = \cos \kappa dt(|W_\uparrow\rangle\langle E_\uparrow^0| - E_\uparrow^0\rangle\langle W_\uparrow|) + \sin \kappa dt(|W_\uparrow\rangle \\ \langle W_\uparrow| + |E_\uparrow^0\rangle\langle E_\uparrow^0|) + |W_\downarrow\rangle\langle W_\downarrow|, \quad \text{(Eqn. 17)}$$

the original state can be recovered to first order in $\kappa dt$.

Alternatively, the recovery may be performed by a measurement projecting to the subspace of logical codewords. By combining detection and correction of both the boson loss and the no-loss errors, the total recovery process is $R = \{\hat{R}_0, \hat{R}_1\}$ described by the Kraus operators $\hat{R}_k = \hat{U}_k \hat{P}_{k \bmod 2}$, where $\hat{P}_{k \bmod 2}$ is a projector to the boson number subspace k mod 2, that is, to a parity subspace. The recovery processes results in, $R(\varepsilon(\hat{\rho})) = \hat{\rho} + O[(\kappa dt)^2]$, that is, correction of the error process to the first order in $\kappa dt$ as desired.

In summary, in act 306 the single mode codes described above can protect against up to L boson loss errors and against no-jump evolution up to order $(\kappa dt)^L$ using the above-described techniques. That is, the codes are approximate quantum error correction codes protected against $\varepsilon_L = \{\hat{E}_0, \hat{E}_1, \ldots, \hat{E}_L\}$ with the same accuracy. Physically this means that if observation of boson loss errors up to a maximum of L times does not yield any information on population and phases between the logical code words $|W_\sigma\rangle$, then also the observation of no-jump errors ≤L times yields no information and has measurement backaction that does not deform the state. In other words, the codes for $\bar{\varepsilon}_L = \{1, \hat{a}, \hat{a}^2, \ldots, \hat{a}^L\}$ are protected against the no-jump evolution to the same order than the codes are protected against boson jump errors.

Figure 4:
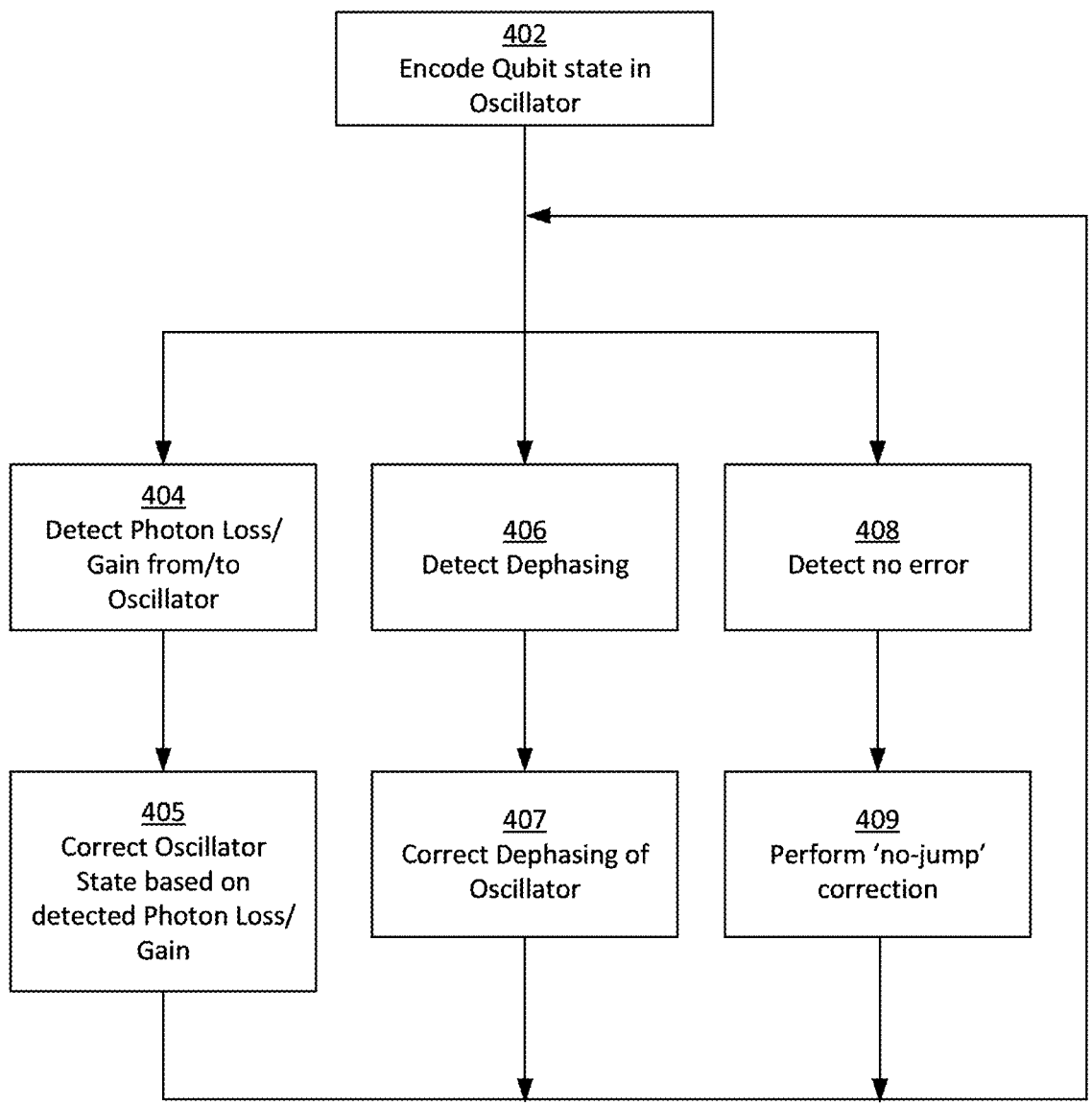
FIG. 4 is a flowchart of a method of correcting one of three classes of errors that occur within a bosonic system, according to some embodiments.

FIG. 4 is a flowchart of a method of correcting one of three classes of errors that occur within a bosonic system, according to some embodiments. Method 400 is a particular example of method 300 performed within a system comprising a qubit coupled to an oscillator (e.g., system 500 discussed below in relation to FIG. 5).

In act 402 the state of the qubit is encoded in the oscillator using one of the binomial codes to represent the state of the qubit in the oscillator, illustrative techniques for which are discussed above. In acts 404, 406 or 408, an error syndrome is detected that may be a photon gain/loss, dephasing, or a no-jump error, respectively. Illustrative techniques to detect such errors are discussed above. In acts 405, 407 or 409, respectively, transformations are applied to the qubit-oscillator system to correct these errors. In some embodiments, acts 405, 407 and/or 409 may comprise application of electromagnetic pulses to the qubit and/or to the oscillator to perform unitary operations that perform such corrections. For example, those unitary operations discussed above in relation to FIG. 3 may be performed via said application of pulses.

Figure 5:
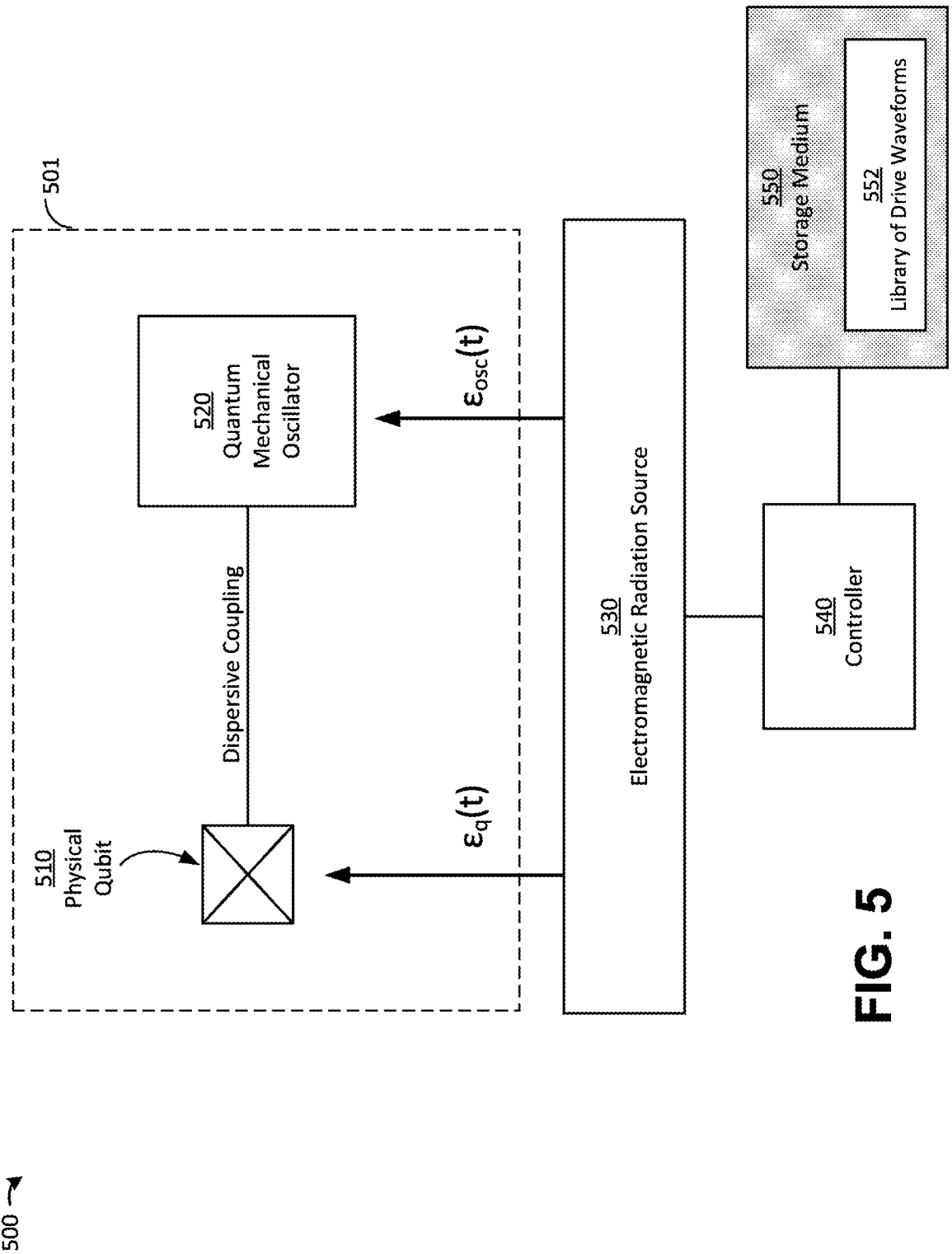
FIG. 5 is a block diagram of a circuit quantum electrodynamics system, according to some embodiments.

FIG. 5 is a block diagram of a circuit quantum electrodynamics system, according to some embodiments. System 500 includes a system 501 in addition to electromagnetic radiation source 530, controller 540 and storage medium 550. In some embodiments, a library of precomputed drive waveforms may be stored on a computer readable storage medium and accessed in order to apply said waveforms to a quantum system. In the example of FIG. 5, controller 540 accesses drive waveforms 552 stored on storage medium 550 (e.g., in response to user input provided to the controller) and controls the electromagnetic radiation source 530 to apply drive waveforms $\varepsilon_q(t)$ and $\varepsilon_{osc}(t)$ to the qubit and oscillator, respectively.

System 501 includes a physical qubit 510 and a quantum mechanical oscillator 520. In the example of FIG. 5, the qubit and the oscillator are dispersively coupled—that is, the qubit-oscillator detuning is much larger (e.g., an order of magnitude larger) than the coupling strength between the qubit and the oscillator. An electromagnetic signal $\varepsilon_q(t)$ may be applied to the physical qubit 510 and an electromagnetic signal $\varepsilon_{osc}(t)$ may be applied to the quantum mechanical oscillator 520. As used herein, application of such an electromagnetic signal or pulse may also be referred to as "driving" of the qubit and/or oscillator.

According to some embodiments, drive waveforms $\varepsilon_q(t)$ and $\varepsilon_{osc}(t)$ may be determined via numerical techniques for a particular desired state change of the system 500. In particular, suitable drive waveforms may be determined that allow $\varepsilon_q(t)$ and $\varepsilon_{osc}(t)$ to be applied simultaneously to the physical qubit and the oscillator, respectively. The drive waveforms $\varepsilon_q(t)$ and $\varepsilon_{osc}(t)$ may be applied during the same time period (i.e., may start and end together) or may simply overlap in time. These drive waveforms may be stored in the storage medium 550 in library 552, having been previously computed to transition the system 501 from an initial state to a desired final state. According to some embodiments, the drive waveforms may include waveforms that, when applied to the qubit 510 and oscillator 520, transition the oscillator from state that is a superposition of error words into a superposition of logical codeword states, as described above. For example, the drive waveforms may include waveforms that, when applied to the qubit and the oscillator, produce the state transitions given by Eqn. 4.

FIG. 6 illustrates a two-parameter (N, S) labeling of the binomial codes (Eqn. 11). The largest circle denotes the code (Eqn. 6) protected against a boson loss error L=1, the large square is the code (Eqn. 7) protected against $\bar{\varepsilon}_2 = \{1, \hat{a}, \hat{a}^2, \hat{n}\}$ or $\bar{\varepsilon}'_2 = \{1, \hat{a}, \hat{a}', \hat{n}\}$, and the large diamond denotes the code (Eqn. 9) protected against $\bar{\varepsilon}'_1 = \{1, \hat{a}, \hat{n}\}$. The parameter S=L+G sets the total number of detectable boson loss errors L and gain errors G. The parameter N sets the maximum order the code is protected against boson loss, gain and dephasing errors N=max{L,G,2D}. The codes shown on or between the lines labeled "S=2N" and "S=N" have protection against boson loss and gain errors set by S=L+G and in addition they are protected against dephasing up to $\hat{n}^{L/2}$. The codes to the left of the line labeled "S=2N" allow in addition heralding of S−2N uncorrectable boson loss or gain errors. The codes to the right of the line labeled "S=N" are protected against a total of S boson loss and gain errors, as well as against up to $\hat{n}^{N/2}$ dephasing errors. The error words of a binomial code are also valid logical codewords but with a reduced value for the parameter N, since a boson loss or gain error decreases N→N−1 and a dephasing error reduces N→N−2.

Note that the spacing between the occupied Fock states is S+1 in the codewords (Eqn. 11). This means that all boson loss and gain errors can be uniquely distinguished by measuring boson number mod S+1. Next, the quantum error correction conditions in Eqn. 5 imply that $\langle W_\sigma|(\hat{a}^\dagger)^l \hat{a}^l|$ $W_o\rangle$ for all l'≤max{L,G} be equal for the two logical codewords, just as the mean boson number of the logical codewords (Eqn. 6) was required to be equal. Inclusion of dephasing errors makes the QEC matrix (Eqn. 11) non-diagonal, but it follows from the binomial coefficients that dephasing errors up to order [max{L, G}/2] (where the square brackets indicate integer part of) are also corrected by these codes. The spacing S=L+G sets the maximum number of detectable and correctable boson loss and gain errors and L+1 can be seen as the distance of the binomial quantum codes. The highest degree of dephasing correction can be increased via N without limit. Note also that since the binomial codes are protected against the error set in (Eqn. 10), they are also protected against all errors that are superpositions of these, such as displacement errors $\hat{D}(\alpha)=\exp(\alpha\hat{a}^\dagger-\alpha^*\hat{a})$ for small $\alpha$.

Figure 7:
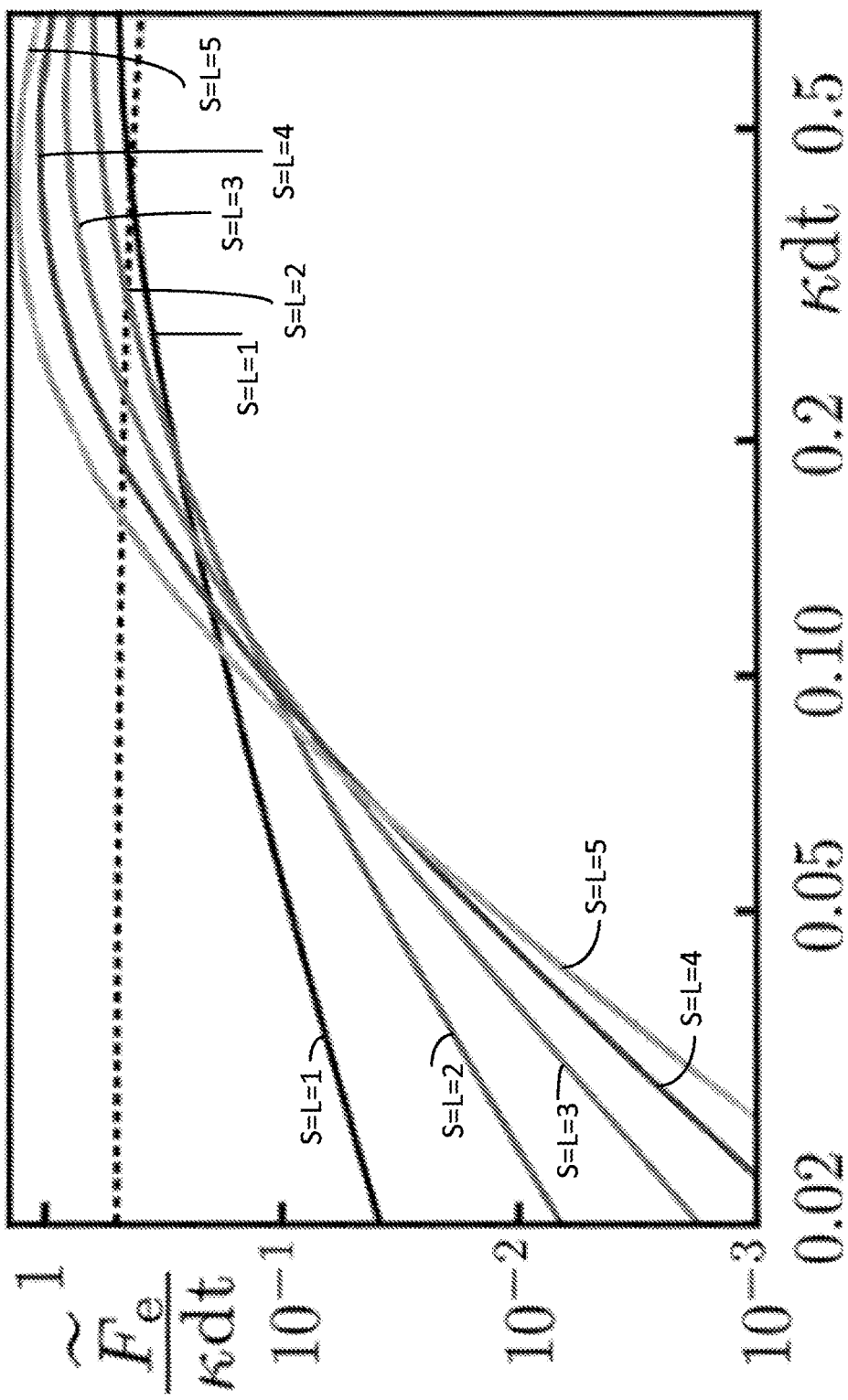
FIG. 7 illustrates the rate of entanglement infidelity for binomial quantum error correction codes, according to some embodiments.

FIG. 7 illustrates the rate of entanglement infidelity for binomial quantum error correction codes, according to some embodiments. Ignoring first infidelities in the recovery process, the performance of a binomial code may be estimated by the rate of uncorrectable errors. When including several error channels, that is boson loss, boson gain and dephasing errors with rates $\kappa$, $\kappa_+$ and $\gamma$, the exact expression for the dominant uncorrectable error depends on the relative ratio of these rates. However, it is physically reasonable to assume that the boson loss channel is the dominating one, $\kappa > \kappa_+, \gamma$. Then, the rate of uncorrectable errors is also dominated by the largest uncorrectable boson loss error rate, that is, the error rate $P_{L+1}/dt=\langle\hat{E}_{L+1}^\dagger\hat{E}_{L+1}\rangle/dt$ of losing L+1 bosons during dt. This scales as $(\kappa dt)^L S^{L+1}$ which implies that for a time step dt there exists an optimal binomial code with finite L, S and N that minimizes the uncorrectable error rate among different binomial codes.

FIG. 7 illustrates the rate of entanglement infidelity $\tilde{F}_e/dt$, in units of $\kappa$, plotted as a function of the time step dt, in units of $1/\kappa$, for the binomial codes of Eqn. 11 with S=L=1, 2, 3, 4 and 5 as labeled in the figure. In the example of FIG. 7, a perfectly faithful recovery process is assumed for the purposes of illustration. Note the logarithmic scale of each axis. The dashed line in FIG. 7 indicates the performance of a naive encoding, $|W_{\uparrow/\downarrow}\rangle=|0/1\rangle$, whose rate of entanglement infidelity at small dt approaches $\kappa/2$ corresponding to the rate of a boson loss with $\bar{n}=1/2$. The binomial codes described herein outperform the naive encoding approach with time step dt0.4$\kappa^{-1}$ and the binomial codes with L≥2 become favorable with time step dt0.2$\kappa^{-1}$. Entanglement infidelity may be calculated as $\tilde{F}_e=1-F_e=1-\Sigma_{k=0}^L\Sigma_{l=0}^\infty|\text{Tr}(\hat{\rho}_c\hat{R}_k\hat{E}_l)|^2$, where $\hat{\rho}_c=\Sigma_\sigma|W_\sigma\rangle\langle W_\sigma|/2$. The entanglement infidelity is in general dependent on the input state. However, here we use the fully mixed state $\hat{\rho}_c$ as an input since then the entanglement fidelity is equal to the $\chi_{II}$ component of the process map. At small dt, the slopes of $\tilde{F}_e/dt$ agree well with the slopes for the rate of the largest uncorrectable error $P_{L+1}/dt$.

In the example of FIG. 7, we have demonstrated the performance of the binomial codes for S=L=0, . . . , 5 via the rate of the entanglement infidelity which, in the absence of infidelities in the recovery process and at small time steps dt, is well approximated by largest uncorrectable error rate. Physically the observed scaling can be understood since the mean boson number $$\bar{n}=\frac{1}{2}(L+1)(S+1)$$

increases quadratically with the number of protected boson loss errors L implying faster decay of the code words and that to achieve the advantage of higher-order protection, the checking times dt may be made appropriately smaller. Larger codes are preferable for smaller checking times. However, an experimental infidelity e related to a single recovery stage increases the error rates by $\epsilon/dt$ favoring low-order binomial codes with longer time steps (see Appendix C). The optimality of a code depends also on the detailed structure of the experimental recovery process; some of the infidelities can be correctable errors suppressed by the next round of the recovery process. In the presence of known error sources, the confidence of the error detection and consequently the fidelity of the recovery process can be improved by the means of quantum state filtering and smoothing, that is, using effectively the measurement record.

Aside from improving lifetimes of quantum memories and quantum bits, bosonic mode quantum error correction is also useful for quantum communication which consists of quantum state transfer and generation of high-fidelity entangled pairs of quantum bits between two distant locations or nodes in a quantum network. As discussed above, a photonic or other bosonic system may be used as a communication medium wherein a qubit (or other quantum system) has its state mapped onto the bosonic system, which transmits or otherwise transfers the state across physical space, and maps the state onto a second qubit system. In this manner, the bosonic system acts akin to a fiber optic or other communication medium utilizing light by transporting information across a physical space.

Figure 8A:
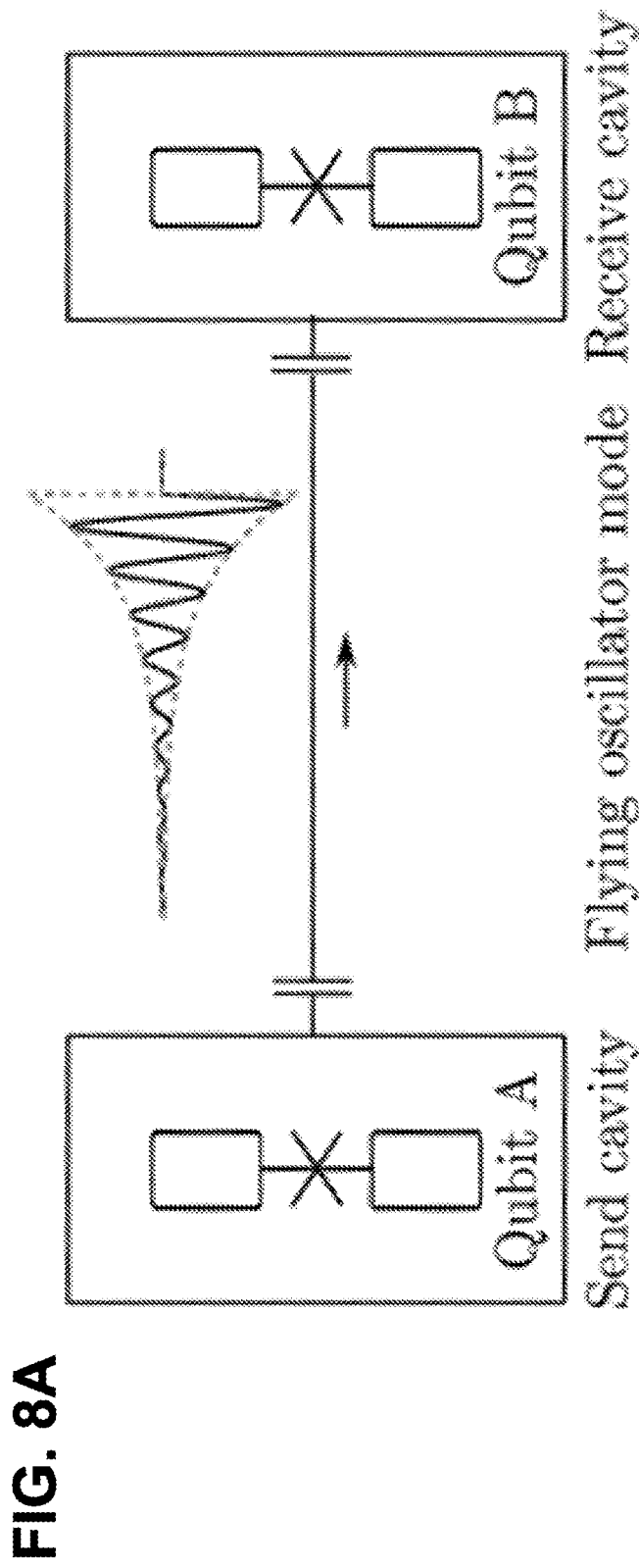
FIG. 8A is a sketch of an illustrative circuit QED system.
Figure 8B:
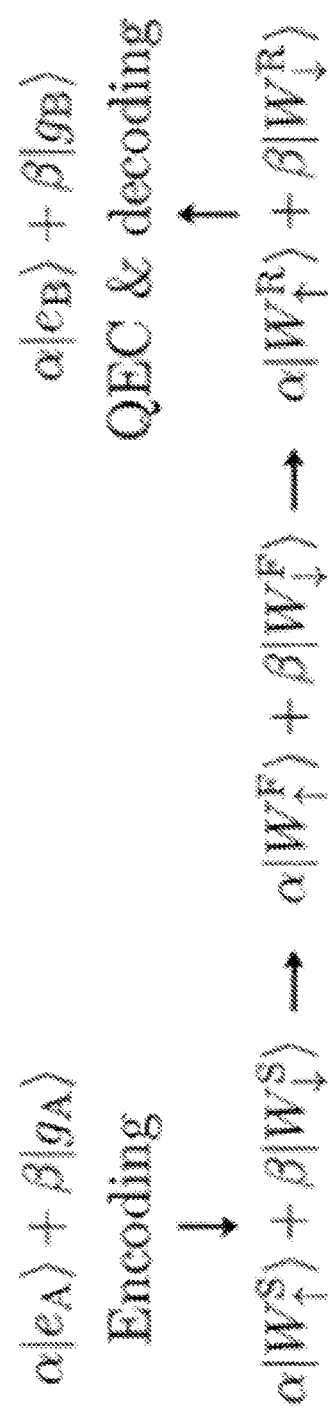
FIG. 8B is a schematic of a quantum state transfer scenario for the system depicted in FIG. 8A, utilizing encoding and quantum error correction of the binomial quantum states.

We consider here an illustrative task, namely the 'pitch-and-catch' scenario for a quantum state, schematized in FIGS. 8A-8B. FIG. 8A is a sketch of a circuit QED hardware proposal and FIG. 8B is a schematic of a quantum state transfer scenario utilizing encoding and quantum error correction of the binomial quantum states. In the example of FIGS. 8A-8B, after encoding the qubit state to the send cavity, by controlling the cavity decay one can tailor a temporal mode for the flying, traveling oscillator mode that is fully absorbed by the receiving cavity. The received cavity state may have suffered from photon loss errors (Eqn. 14), dephasing and photon gain errors that can be recovered by performing the recovery process before decoding it to the physical qubit.

The illustrative scenario of FIGS. 8A-8B comprises initializing the qubit A into a superposition of the ground and excited state $\alpha|e\rangle_A+\beta|g\rangle_A$, encoding (a unitary swap operation) of the qubit state into the logical codewords of the send cavity $\alpha W_\uparrow^S+\beta W_\downarrow^S$ using one of the binomial codes, letting the cavity state leak in a time-reversal symmetric manner (pitch) into a transmission line or to other kind of a flying oscillator $\alpha W_\uparrow^F+\beta W_\downarrow^F$ such that the inverse process (catch) is most efficient into the receiving cavity $\alpha W_\uparrow^R+\beta W_\downarrow^R$. The transfer is finalized by decoding (a unitary swap operation) the received cavity state to the qubit B resulting in $\alpha|e\rangle_B+\beta|g\rangle_B$, corresponding to a transfer of the qubit state between the qubits. The remote physical qubits can be entangled by replacing the first swap with a CNOT-gate between the physical qubit A and logical qubit of the cavity.

The process is vulnerable to various errors and infidelities at the different stages of the transfer process. The most obvious imperfection is the attenuation of the state of the flying oscillator by photon loss processes, similar to (Eqns. 12-14), during the transmission. The local decoding and encoding operations between the cavity and qubit states can be imperfect as well. An important part of the 'pitch-andcatch' process is the engineering of the temporal mode of the flying oscillator so that the catch by the receiving cavity is as reflectionless as possible. Reflection can be modeled as an additional photon loss process. In addition, the cavities can suffer dephasing events through uncontrolled transitions of the qubits and the cavity states can decay also to unwanted channels not just to the transmission channel. If one uses naive encoding $W_{\uparrow/\downarrow}{}^i$ photon loss errors lead to exponential loss of process fidelity as a function of transmission distance and similarly other errors lead to unfaithful transmission. When using the binomial codewords or other quantum codes as the logical codewords in the cavities, the fidelity can be increased by performing a recovery process on to the received cavity state before decoding it to the receiving qubit B. This way one can improve the fidelity by the amount that the correctable errors (Eqn. 10) contribute to the full error process.

In classical communication we typically use the continuous variables of amplitude and/or phase of the electromagnetic field to transmit a signal. One of the popular coding schemes is the phase-shift keying (PSK), which is a digital modulation scheme that conveys data by changing/modulating the phase of a reference signal. For example, the quadrature phase-shift keying uses the 4 equal-spaced points ($\alpha$, $i\alpha$, $-\alpha$, $-i\alpha$) on a circle with radius a in the phase space to encode 2 classical bits of information. Generally, we can use d equal-spaced points on a circle $\{\omega^k \alpha\}_{k=1,2,\ldots,d-1}$ with $\omega = e^{i2\pi/d}$ to encode $\log_2 d$ classical bits of information. In the presence of signal attenuation, PSK can reliably encode the information so long as the phase of the reference signal can be reliably extracted. Owing to its simplicity, PSK is widely used in existing technologies in classical communication, such as the Bluetooth 2 standard and wireless LAN standard.

There may be a class of quantum continuous variable codes that is closely related to classical PSK encoding. The binomial codes can be regarded as a code that can correct multiple excitation loss errors, which can be used for quantum communication. In particular, it can be used for correcting photon loss errors in the third generation of quantum repeaters. In the perspective of secure quantum communication (quantum key distribution, QKD), the binomial codes defeat eavesdroppers. While an eavesdropper could try to probe the communicated codewords by removing a small number of photons from the code words or by acting with another operator that the code is protected against, the eavesdropper would not acquire any information about the word being sent. This is because those photon losses do not give any hint as to which code word they came from. Indeed, this is precisely why the intended receiver can still recover code words despite losses.

According to some embodiments, the example of FIGS. 8A-8B could be repeated a number of times to cross a larger distance. In other words, a quantum repeater could be produced that utilized a number of cavities between an initial send cavity and a final receive cavity that each receive, then send the state (by leaking the state out of the cavity).

According to some embodiments, a quantum communication system may be formed that links microwave resonators via optical fiber(s) and/or via other suitable means for propagating electromagnetic signals. For instance, optomechanical transducers can perform quantum state transfer from a microwave resonator to flying optical photons (and the reverse down-conversion) via an optomechanical transducer. Such converters could play a central role in quantum communications. According to some embodiments, such communication comprises up-conversion from microwave to optical, transmission of the optical state through a fiber and then down-conversion from optical to microwave at the remote location. All three steps could involve photon loss, gain or dephasing errors. Thus rather than using the 0 and 1 photon number states to hold the quantum information it may be useful to use binomial codewords $|W_\uparrow\rangle$, $|W_\downarrow\rangle$ which can be corrected for such errors as described herein.

Figure 9:
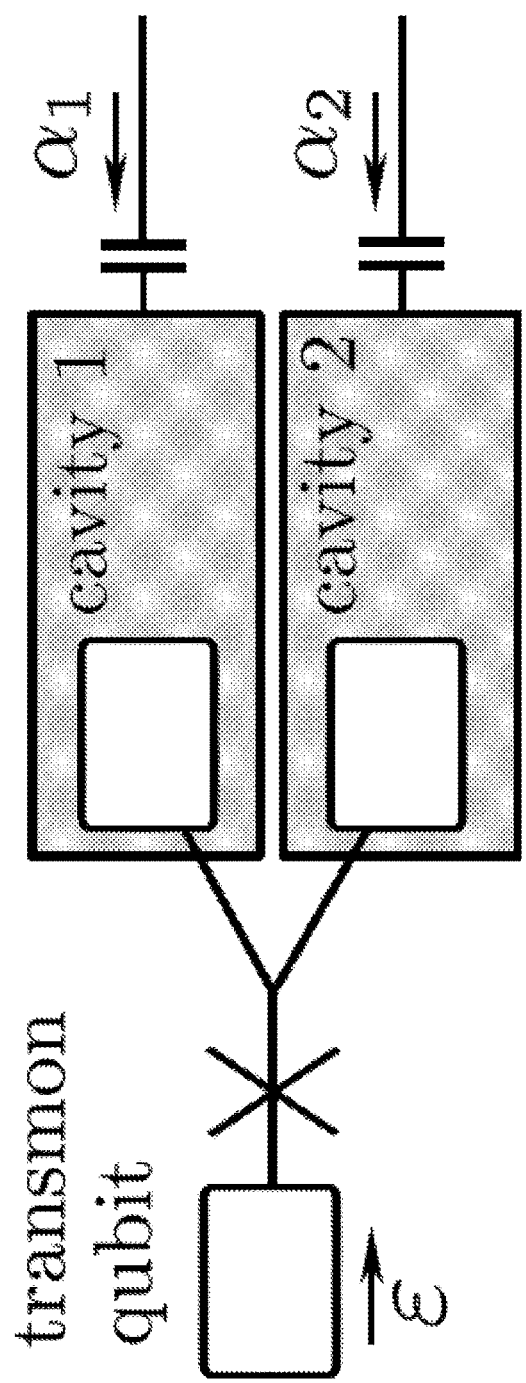
FIG. 9 is a block diagram of a single-qubit, two-cavity system suitable for implementing two-mode codes.

FIG. 9 is a block diagram of a single-qubit, two-cavity system suitable for implementing two-mode codes. System 900 is another example of a system in which the two-mode (binomial) codes described above may be implemented. The single-qubit, two-cavity experimental configuration shown in FIG. 9 is in principle sufficient to realize universal control of the two modes for the following reasons.

The Hamiltonian of the dispersive coupling between the qubit and the cavities is of the form $$H_{disp} = \sum_{j=1}^{2} \chi_j \hat{a}_j^\dagger \hat{a}_j \hat{\sigma}_z,$$

where $\hat{a}_j$ is the annihilation operator for the jth mode. Additional Hamiltonian terms come from independent drives on the cavities $H_{j,d} = \alpha_j^* \hat{a} + \alpha_j \hat{a}^\dagger$, and the qubit $\hat{H}_Q = \vec{n} \cdot \vec{\sigma}$, where the $\alpha_j$ and $\vec{n}$ are externally controlled. The existing Hamiltonian terms can generate a more complex effective Hamiltonian using the approximate identities:

$$e^{i\hat{A}dt} e^{i\hat{B}dt} e^{i\hat{B}dt} e^{i\hat{A}dt} = e^{2i(\hat{A}+\hat{B})dt} + \mathcal{O}(\delta t^3) \quad \text{(Eqn. 18)}$$

$$e^{-i\hat{A}dt} e^{-i\hat{B}dt} e^{i\hat{A}dt} e^{i\hat{B}dt} = e^{[\hat{A},\hat{B}]dt^2} + \mathcal{O}(\delta t^3) \quad \text{(Eqn. 19)}$$

These identities can be applied and combined multiple times to produce superpositions of higher order commutators; $[\hat{A},[\hat{A},\hat{B}]]$.

To establish universal control of the multimode system, it may be sufficient to show that each mode can be universally controlled, and that it is possible to generate a beamsplitter interaction $\hat{x}_i \hat{p}_j - \hat{x}_j \hat{p}_i$ (equivalent to $\hat{a}_i \hat{a}_j^\dagger + \hat{a}_j \hat{a}_i^\dagger$) between different modes $i \neq j$. Using the identity (Eqn. 19), the cavity drives along with the dispersive interaction generate effective, qubit-coupled drives on an individual cavity:

$$i\hat{H}_{j,eff} = \left[\alpha_j \hat{a}_j - \alpha_j^* \hat{a}_j^\dagger, i\sum_{k=1}^{2} \chi_k \hat{a}_k^\dagger \hat{a}_k \hat{\sigma}_z\right] = i\chi_j \hat{\sigma}_z (\alpha_j \hat{a}_j + h.c.) \quad \text{(Eqn. 20)}$$

Choosing $\alpha_j$ to be real or imaginary results in effective operators $\propto \hat{p}_j \hat{\sigma}_z$ or $\hat{x}_j \hat{\sigma}_z$. Combining these with pre- and post-rotations of the qubit yields, e.g. $\hat{x}_j \hat{\sigma}_y$. Applying (Eqn. 19) again enables the construction of products of the mode operators, for example:

$$[i\hat{x}_i \hat{\sigma}_y, i\hat{x}_j \hat{\sigma}_z] = i\hat{x}_i \hat{x}_j \hat{\sigma}_x \quad \text{(Eqn. 21)}$$

$$[i\hat{p}_i \hat{\sigma}_y, i\hat{p}_j \hat{\sigma}_z] = i\hat{p}_i \hat{p}_j \hat{\sigma}_x \quad \text{(Eqn. 22)}$$

$$[i\hat{x}_i \hat{\sigma}_y, i\hat{p}_j \hat{\sigma}_z] = i(\hat{x}_i \hat{p}_j + \hat{p}_j \hat{x}_i) \hat{\sigma}_x \quad \text{(Eqn. 23)}$$

Using (Eqn. 18) to sum (Eqn. 21) and (Eqn. 22) with $i=j$ gives a single mode dispersive interaction, which in combination with external cavity drives is enough to produce single mode universal control. Superposing (Eqn. 23) with the same term with the opposite sign and $i \leftrightarrow j$ produces the beamsplitter interactions that are sufficient to give universal control of the multimode system.

APPENDIX A—EXTENDED BINOMIAL CODES

In this section we show that the expectation value of the moment of the photon number operator $\hat{n}$ is identical for both codewords $W_{\uparrow/\downarrow}$ from Eqn. 11. In other words, we show that $$\langle W_\sigma | \hat{n}^l | W_\sigma \rangle = a_l \text{ for } 0 \le l \le \max\{L,G\} \qquad (A1)$$

and for some real $\sigma$-independent $\alpha_l$. The l=0 case conveniently takes care of orthonormality between the codewords while the l≠0 conditions guarantee that the words can be corrected from various errors (up to the relevant order). We then extend the definition Eqn. 11 to qudits and perform a similar proof for moments of the qudit codewords.

A.1 Moments of $\hat{n}$: Binomial Codes

To prove the Equation (A1), we show that the difference of the moments of $W_\uparrow$ and $W_\downarrow$, $$\Delta_l = \langle W_\uparrow | \hat{n}^l | W_\uparrow \rangle - \langle W_\downarrow | \hat{n}^l | W_\downarrow \rangle \qquad (A2)$$

is zero. Using definition (Eqn. 11), the difference between the even and odd populated words is $$\Delta_l = \frac{(S+1)^l}{2^N} \sum_{p=0}^{N+1} \binom{N+1}{p} p^l (-1)^p. \qquad (A3)$$

For l=0, the sum is equivalent to a binomial expansion of $(1+x)^{N+1}$ with $x=-1$ (which is clearly zero). The nonzero l case is equivalent to taking derivatives of the binomial expansion and multiplying by x (before substituting x=−1). This is because each action of the derivative brings down a power of p while multiplication by x bring $x^{p-1}$ back to $x^p$. In total, $$\Delta_l = \frac{(S+1)^l}{2^N} \left( x \frac{d}{dx} \right)^l (1+x)^{N+1} \bigg|_{x=-1}. \qquad (A4)$$

Each action of the derivative acting on $(1+x)^{N+1}$ subtracts one from the power N+1. Since l≤max{L, G}, the largest subtracted power is max{L, G}. However, since N=max{L, G,2D} (where D accounts for dephasing errors and is not relevant here), there will always be a nonzero power of 1+x remaining after the action of the derivative. Therefore, the expression (A4) is a polynomial in x and 1+x containing only nonzero powers of 1+x. Substituting x=−1 into that polynomial yields $\Delta_l=0$.

A.2 Qubit Extension

To generalize the binomial codes to qudits, we first define a Fourier transformed qubit basis $\{|\tilde{W}_\mu\rangle\}_{\mu=0,1}$ by taking a normalized sum and difference of the codewords $\{|W_\sigma\rangle\}_{\sigma=\uparrow,\downarrow}$:

$$|\tilde{W}_\mu\rangle \equiv \frac{1}{\sqrt{2^{N+1}}} \sum_{p=0}^{N+1} (-)^{\mu p} \sqrt{\binom{N+1}{p}} |(S+1)p\rangle. \qquad (A5)$$

The Greek indices μ,ν are for now evaluated modulo 2. This basis allows for a similar proof of the moments of $\hat{n}$ being equal as above and reveals a straightforward extension to the qudit case. We first introduce the extension and then produce the proof.

We extend the above qubit states to the qudit case using extended binomial coefficients (see and refs. therein; these are also called polynomial coefficients). Letting d≥1 be the dimension of the logical qudit space, we define extended binomial coefficients recursively, starting from the ordinary binomial coefficients. Defining $$\binom{n}{m}_1 \equiv 1 \text{ and } \binom{n}{m}_2 \equiv \binom{n}{m}$$

for nonnegative integers n and m, the extended binomial coefficients are $$\binom{n}{m}_d = \sum_{k=0}^{n} \binom{n}{k} \binom{k}{m-k}_{d-1} \qquad (A6)$$

These coefficients, first studied by Euler, show up next to powers of x in the expansion $$(1+x+\ldots+x^{d-1})^n = \sum_{k=0}^{(d-1)n} \binom{n}{k}_d x^k \qquad (A7)$$

Notice that the largest power of x in such an expansion is (d−1)n, which reduces to n for the well-known binomial case. The last ingredient to generalize to qudits is the generalization of $(1+x)^n|_{x=-1}=0$ used in the proof above. For this, we introduce d th roots of unity $$w \equiv \exp\left(i \frac{2\pi}{d}\right)$$

and recall that adding all powers of w from zero to d−1 gives zero. This reveals a set of identities useful in defining and proving the error correction properties of the qudit states:

$$0 = (1+w+\ldots+w^{d-1})^n = \sum_{k=0}^{(d-1)n} \binom{n}{k}_d w^k \qquad (A8)$$

This sum is also zero for any nonzero power of w, i.e., $w \to w^l$ for nonzero integer l. For the zeroth power, the sum gives $d^n$.

We now generalize the binomial codewords to $$|\tilde{W}_\mu\rangle \equiv \frac{1}{\sqrt{d^{N+1}}} \sum_{p=0}^{(d-1)(N+1)} w^{\mu p} \sqrt{\binom{N+1}{p}_d} |(S+1)p\rangle \qquad (A9)$$

where the Greek indices μ,ν∈{0, 1, . . . , d−1} are from now on evaluated modulo d and d≥2. Similar to the qubit case, S=L+G and N=max{L, G,2D} (L quantifies the number of correctable loss errors, G the number of correctable gain errors, and D the number of correctable dephasing errors). We call these codes extended binomial codes to distinguish them from quantum polynomial codes.

A.3 Moments of $\hat{n}$: Extended Binomial Codes

Similar to the qubit case, it should be clear that the spacing S+1 between the nonzero Fock state populations of $|\tilde{W}_\mu\rangle$ guarantees that $\langle\tilde{W}_\mu|\hat{a}^{\dagger l}\hat{a}^{l'}|\tilde{W}_\nu\rangle=0$ for all positive differences $1-l'<S+1$. Therefore, to satisfy the error correction criteria, we are once again left with determining the powers of $\hat{n}$ which can be used to construct any diagonal (in Fock space) products of error operators. Here we show that $$\langle\hat{n}^l\rangle\equiv\langle\tilde{W}_\mu|\hat{n}^l|\tilde{W}_{\mu+\nu}\rangle=\alpha_l\delta_{\nu,0}, \quad (A10)$$

where $\alpha_l$ are real and $\mu$-independent. Using definition (A9), we notice that $$\langle\hat{n}^l\rangle=\frac{(S+1)^l}{d^{N+1}}\sum_{p=0}^{(d-1)(N+1)}\binom{N+1}{p}_d p^l w^{\nu p} \quad (A11)$$

and the $\mu$-dependence is immediately canceled. We now relate this sum to Equation (A7).

For $l=0$, the sum is equivalent to the expansion of $(1+x+\ldots+x^{d-1})^{N+1}$ with $x=w^\nu$. Equation (A8) reveals that this sum is zero unless $\nu=0$, proving that $\{|\tilde{W}_\mu\rangle\}_{\mu=0}^d$ are orthogonal. For the $\nu=0$ case, $w^\nu=1$ and Equation (A7) yields $d^{N+1}$, proving that $\{|\tilde{W}_\mu\rangle\}_{\mu=0}^d$ are properly normalized.

The nonzero $l$ case is equivalent to taking derivatives of the expansion (A7) and multiplying by x (before substituting $x=w^\nu$). In total, $$\langle\hat{n}^l\rangle=\frac{(S+1)^l}{d^{N+1}}\left(x\frac{d}{dx}\right)^l\left(1+x+\ldots+x^{d-1}\right)^{N+1}\bigg|_{x=w^\nu}. \quad (A12)$$

Similar to the ordinary binomial case, each action of the derivative acting on $(1+x+\ldots+x^{d-1})^N+1$ subtracts one from the power N+1, but N is large enough so that there will always remain a nonzero power of $1+x+\ldots+x^{d-1}$ remaining after the action of all derivatives. Therefore, each term in Equation (A12) contains at least one nonzero power of $1+x+\ldots+x^{d-1}$. Substituting $x=w^\nu$ into each term yields zero unless $\nu=0$ and so Equation (A10) holds.

The $\alpha_l$ for the first few $l$ can be easily determined from this method:

$$\alpha_1=\frac{(S+1)}{2}(d-1)(N+1) \quad (A13)$$

$$\alpha_2=\frac{(S+1)^2}{12}(d-1)(N+1)[(d-1)(3N+4)+2].$$

The coefficient $\alpha_1$ is the mean photon number of the codewords, which we see scales linearly with the spacing S, the qudit dimension d, and the maximum number of correctable errors of one type N.

A.4 the Unitary Control of the Binomial Code Recovery Process

We summarize here the conditional unitary control for the recovery of the binomial codes under photon loss channel. The binomial codes are tailored such that the photon loss and gain errors are detected by measuring changes in the generalized photon number parity that serves as a proxy to number of lost photons in a short time step. With superconducting circuit QED technology the ability to measure photon number parity stems from the strong dispersive coupling of an ancillary qubit to the cavity $\hat{H}=\chi\hat{\sigma}_z\hat{a}^\dagger\hat{a}$. When the strength of the dispersive coupling $\chi$ is stronger than the decay rates of the qubit and the cavity, one can drive the qubit conditioned on given photon number states of the oscillator. This can be then used for photon number conditioned qubit operations, such as flipping the qubit state conditioned on a generalized photon parity $$\hat{P}_{k\,mod\,L+1}=\Sigma_{l=k\,mod\,L+1}|l\rangle\langle l|:$$

$$\hat{U}_{k\,mod\,L+1}=\hat{\sigma}_x\hat{P}_{k\,mod\,L+1}+\hat{I}_q(1-\hat{P}_{k\,mod\,L+1}), \quad (A14)$$

After this operation, the measurement of the qubit state realizes measurement of the generalized photon parity and projection of the cavity state by $\hat{P}_{k\,mod\,L+1}$. Error detection is followed by a correction unitary $\hat{U}_k$ that performs a state transfer between the logical codewords $|W_o\rangle$ and the error words $|B_o^k\rangle=\hat{B}_k|W_o\rangle/\sqrt{\langle W_o|\hat{B}_k^\dagger\hat{B}_k|W_o\rangle}$, where the error operation $\hat{B}_k$ is the approximate of the Kraus operator $E_k$ to the L/2:th power in $\kappa$Dt for $k\neq 0$ and for $k=0$ it is to the L:th power. Again the strong dispersive qubit interaction, individual qubit and cavity drives is enough for implementing any unitary to the cavity. The generalized photon number parity measurement and the subsequent unitary transformation implements the Kraus operator $\hat{R}_k=\hat{U}_k\hat{P}_{k\,mod\,L+1}$. Repetition for all of the values of k realizes the full recovery process $R=\{\hat{U}_k\hat{P}_{k\,mod\,L+1}\}$.

APPENDIX B—DERIVATION OF THE KRAUS OPERATORS $\hat{E}_l$

Here, we derive the Kraus operator representation $$\hat{\rho}(t)=\sum_{\ell=0}^\infty\hat{\rho}_\ell(t)=\sum_{\ell=0}^\infty\hat{E}_\ell\hat{\rho}\hat{E}_\ell^\dagger \quad (B1)$$

of the time evolution generated by the standard Lindblad master equation $$\frac{\Delta\hat{\rho}}{\Delta t}=\frac{\kappa}{2}(2\hat{a}\hat{\rho}\hat{a}^\dagger-\hat{a}^\dagger\hat{a}\hat{\rho}-\hat{\rho}\hat{a}^\dagger\hat{a}). \quad (Eqn.\ 12)$$

The zero-jump contribution is only by the no-jump evolution under the non-Hermitian Hamiltonian $$\hat{V}/\hbar=-i\frac{\kappa}{2}\hat{a}^\dagger\hat{a},$$

$$\hat{\rho}_0(t)=e^{-\frac{\kappa t}{2}\hat{n}}\hat{\rho}(0)e^{-\frac{\kappa t}{2}\hat{n}}. \quad (B2)$$

The single jump contribution $\hat{\rho}_1(t)$ consists of the no-jump evolution interrupted by a jump and averaged over all possible jump times, $$\hat{\rho}_1(t)=\int_0^t\kappa\Delta\tau e^{-\frac{\kappa(t-\tau)}{2}\hat{n}}\hat{a}e^{-\frac{\kappa\tau}{2}\hat{n}}\hat{\rho}(0)e^{-\frac{\kappa\tau}{2}\hat{n}}\hat{a}^\dagger e^{-\frac{\kappa(t-\tau)}{2}\hat{n}} \quad (B3)$$

$$=(1-e^{-\kappa t})e^{\frac{\kappa t}{2}\hat{n}}\hat{a}\hat{\rho}(0)\hat{a}^\dagger e^{-\frac{\kappa t}{2}\hat{n}},$$

where $\kappa\Delta\tau$ is the probability for a jump during $\Delta\tau$. Similarly the double jump contribution is $$\hat{\rho}_2(t) = \frac{(1-e^{\kappa t})^2}{2!} e^{-\frac{\kappa t}{2}\hat{n}} \hat{a}\hat{a}\hat{\rho}(0)\hat{a}^\dagger\hat{a}^\dagger e^{-\frac{\kappa t}{2}\hat{n}}, \quad (B4)$$

and the general term for l jumps is $$\hat{\rho}_\ell(t) = \frac{(1-e^{\kappa t})^\ell}{l!} e^{-\frac{\kappa t}{2}\hat{n}} \hat{a}^\ell \hat{\rho}(0)(\hat{a}^\dagger)^\ell e^{-\frac{\kappa t}{2}\hat{n}}, \quad (B5)$$

where we gather the analytic expression for the Kraus operators $$\hat{E}_\ell = \sqrt{\gamma_\ell}\, e^{-\frac{\kappa t}{2}\hat{n}} \hat{a}^\ell = \sqrt{\gamma_\ell e^{k\kappa\tau}}\, \hat{a}^\ell e^{-\frac{\kappa t}{2}\hat{n}}. \quad \text{(Eqn. 14)}$$

where $\gamma_\ell = (1-e^{-\kappa\tau})^\ell/l!$ is related to the probability of the process $\hat{\rho} \to \hat{E}_\ell \hat{\rho} \hat{E}_\ell$. When considering a small time interval $\Delta t$ and expanding $\hat{E}_\ell$ to the lowest order in $\kappa\Delta t$, we see that roughly speaking a photon loss error occurs with a probability proportional to $\sqrt{\kappa\Delta t}$.

If this is a proper Kraus representation, it obeys the identity relation $\Sigma_{\ell ll=0}^\infty \hat{E}_\ell^\dagger \hat{E}_\ell = I$. From (Eqn. 14) we have $$\hat{\Xi} = \sum_{\ell=0}^\infty \hat{E}_\ell^\dagger \hat{E}_\ell = \sum_{\ell=0}^\infty \frac{(1-e^{-\kappa t})^\ell}{l!} (\hat{a}^\dagger)^\ell e^{-\kappa t\hat{n}} \hat{a}^\ell. \quad (B6)$$

To see if this is the identity, we apply it to an arbitrary Fock state m and recognize the resulting binomial expansion yielding $$\hat{\Xi}m = \left[\sum_{\ell=0}^m \frac{(1-e^{-\kappa t})^\ell (e^{-\kappa t})^{m-\ell}}{l!} \frac{m!}{(m-l)!}\right] m \quad (B7)$$

$$= \left[\sum_{\ell=0}^m (1-e^{-\kappa t})^\ell (e^{-\kappa t})^{m-\ell} \binom{m}{\ell}\right] m$$

$$= m.$$

Since this is true for every m, the identity relation $\hat{\Xi} = I$ is indeed satisfied. The Kraus operator expansion is not unique. This particular form organizes the errors according to how many photons are lost. Because of the no-jump evolution in between the jumps, the error operator for 1 photon losses is $\hat{E}_\ell$ and not simply $\hat{a}^\ell$.

APPENDIX C—ANALYSIS AND OPTIMIZATION OF THE BINOMIAL CODE PERFORMANCE

C.1 Unfaithful Recovery Process

Above we showed that the performance of a binomial code (Eqn. 11) protected against L photon loss errors is well analyzed by the largest rate of the unrecoverable errors, that is the rate of losing of L+1 photons during a time step $\Delta t$, $$\frac{P_{L+1}}{\Delta t} = \frac{\langle \hat{E}_{L+1}^\dagger \hat{E}_{L+1}\rangle}{\Delta t} \cdot (\kappa\Delta t)^L L^{L+1}, \quad (C1)$$

where we have for simplicity assumed that S=L. The recovery process is practically always associated with an infidelity related to unfaithful gates and imprecise measurements. We model this so that performance of the code is characterized by the error rate that is sum of the largest of the unrecoverable errors and the infidelity $\varepsilon$ of the recovery process:

$$\frac{P_T}{\Delta t} \approx N(\kappa\Delta t)^L L^{L+1} + \frac{\varepsilon}{\Delta t}, \quad (C2)$$

where N is the prefactor of the $P_{L+1}$ scaling. The optimal time step is $$\Delta t_{opt} = (\varepsilon/LN)^{\frac{1}{L+1}}/S$$

which balances between minimizing the rate of unrecoverable errors and the infidelity of the recovery process itself. With this optimal time step, the best performance of an unfaithfully recovered binomial code scales as function of $\varepsilon$ as $$\frac{P_T^{opt}}{\Delta t} = \varepsilon^{\frac{L}{L+1}} \left(L^{\frac{1}{L+1}} + L^{\frac{L+2}{L+1}}\right) N^{\frac{1}{L+1}}. \quad (C3)$$

The performance benefit of higher order codes is achieved only with small $\varepsilon$.

C.2 Optimization of the Recovery Process

A simple way of making a sub-leading improvement in the fidelity of the recovery process of the codes is to add a unitary 'echo' operation $\hat{U}_x$ that performs state transfer $|W_\uparrow\rangle \leftrightarrow |W_\downarrow\rangle$ to the recovery operations $\hat{R}'_l = \hat{U}_x \hat{R}_l$.

In general, given the error channels, the most optimal recovery process of a binomial code can be found by overall minimizing the averaged infidelity that can require numerical optimization by semi-definite programming. The optimized recovery process cannot beat the overall accuracy limit set by the binomial code itself but the pre-factors of the higher-order, uncorrectable terms in the infidelity can be made considerably smaller.

APPENDIX D—NON-DIAGONAL CODES

An analytic example is the code $$|W_\uparrow\rangle = \frac{1}{\sqrt{6}}\left(\sqrt{7-\sqrt{17}}\,|0\rangle + \sqrt{\sqrt{17}-1}\,|3\rangle\right) \quad \text{(D1a)}$$

$$|W_\downarrow\rangle = \frac{1}{\sqrt{6}}\left(\sqrt{9-\sqrt{17}}\,|1\rangle - \sqrt{\sqrt{17}-3}\,|4\rangle\right). \quad \text{(D1b)}$$

that protects against errors $\varepsilon_2 = \{\varepsilon_0, \varepsilon_1\}$ up to first order in $\kappa\Delta t$ similarly as the binomial code L=S=N=1 but with remarkably lower $P_2$ and $\bar{n} = (\sqrt{17}-1)/2 \approx 1.56$. Here, the only way to detect errors is to make projective measurements into the logical word basis $\hat{P}_W = \Sigma_o |W_o\rangle\langle W_o|$ followed by the swap unitary performing $|W_\sigma\rangle \leftrightarrow \langle E_\sigma^1|$ if the measurement yields a negative answer, realizable with the current technology.

This code can be further extended to be protected against also against photon addition errors resulting in $$|W_\uparrow\rangle = \frac{1}{\sqrt{8}}\left(\sqrt{9-\sqrt{21}}\,|0\rangle + \sqrt{\sqrt{21}-1}\,|4\rangle\right), \quad (D2a)$$

$$|W_\downarrow\rangle = \frac{1}{\sqrt{8}}\left(\sqrt{11-\sqrt{21}}\,|1\rangle - \sqrt{\sqrt{21}-3}\,|5\rangle\right). \quad (D2b)$$

with lower $\bar{n}=(\sqrt{21}-1)/2\approx 1.79$ and $P_2$ than the corresponding binomial code.

D.1 the Error Correction Process for Non-Diagonal Codes

Here we describe in detail the error correction process for non-diagonal codes with QECC matrix $\langle W_\sigma|\hat{E}_k^\dagger \hat{E}_l|W_{\sigma'}\rangle = \beta_{kl}\delta_{\sigma\sigma'}$, where $\hat{E}_k$, $k=0, 1, \ldots, L$ and $\beta_{kl}$ are entries of a Hermitian matrix that is not readily in a diagonal form. Based on the hermiticity we can diagonalize the matrix $\beta_{kl}$ such that $$\langle W_\sigma|\hat{F}_k^\dagger \hat{F}_l|W_{\sigma'}\rangle = \beta_k \delta_{kl}\delta_{\sigma\sigma'} \quad (D3)$$

where the true errors can be expressed with the help of the diagonalized errors $$\hat{E}_k = \sum_{m=0}^{L} \gamma_{km} \hat{F}_m. \quad (D4)$$

This physically means that whenever a true physical error $\hat{E}_k$ occurs to a quantum state $|\psi\rangle = \alpha|W_1\rangle + \beta|W_2\rangle$ the quantum state is transformed to a superposition of the diagonalized error states $\hat{F}_m|W_\sigma\rangle = |F_\sigma^m\rangle$:

$$|\psi'\rangle = \frac{\hat{E}_k|\psi\rangle}{\sqrt{\langle\psi|\hat{E}_k^\dagger \hat{E}_k|\psi\rangle}} \quad (D5)$$

$$= \frac{1}{\sqrt{\sum_{m=0}^{L}\beta_m|\gamma_{km}|^2}} \sum_{m=0}^{L} \gamma_{km}(\alpha|F_\uparrow^m\rangle + \beta|F_\downarrow^m\rangle).$$

The error correction process starts by making a measurement that asks in which of the disjoint diagonalized error subspaces $|\{F_\sigma^m\}\rangle$ the system is in. Explicitly, if the measurement is executed with an ancillary L+1-level system initially in the ground state, then one has to first realize an entangling unitary operation $$\hat{U} = \sum_{m=0}^{L} \hat{P}_m \otimes (|0\rangle\langle m| + |m\rangle\langle 0|), \quad (D6)$$

where $\hat{P}_m$ are projectors to the m:th diagonalized error subspace:

$$\hat{P}_m = \tilde{\beta}_m^{-1}(|F_\uparrow^m\rangle\langle F_\uparrow^m| + |F_\downarrow^m\rangle\langle F_\downarrow^m|). \quad (D7)$$

By using Equation (D3), one sees that is a proper projector $\hat{P}_m\hat{P}_n = \hat{P}_m\delta_{mn}$. Alternatively, the measurement of Eqs. (D6)-(D7) can be realized with an ancillary qubit by sequentially performing entangling operation sequentially for m=0, 1 ..., L $$\hat{U} = \hat{P}_m\hat{\sigma}_x + (1-\hat{P}_m)\hat{I} \quad (D8)$$

followed by a qubit population measurement. With both ways the measurement gives an answer M with the following measurement backaction to the protected system:

$$|\psi'\rangle \rightarrow \frac{\hat{P}_M|\psi'\rangle}{\sqrt{\langle\psi'|\hat{P}_M|\psi'\rangle}} = \alpha|F_\uparrow^M\rangle + \beta|F_\downarrow^M\rangle. \quad (D9)$$

Notice that one does not know and does not need to know which of the physical errors occurred. The error correction is finalized by recovering the original state by a unitary operation $\hat{U}_M$ that performs state transfer $|W_\sigma\rangle \leftrightarrow |F_\sigma^M\rangle$. In the perspective of the protected quantum system, the error correction process is described by the Kraus operators $\hat{A}_M = \hat{U}_M\hat{P}_M$, $\Sigma_{M=0}^{L}\hat{A}_M\hat{\rho}\hat{A}_M^\dagger$.

APPENDIX E—APPROXIMATE QUANTUM ERROR CORRECTION

E.1 Example of the AQEC for a Non-Trivial Code

Here, we study in a general level the robustness of codes $\bar{\varepsilon}_L = \{1, \hat{a}, \hat{a}, \ldots, \hat{a}^L\}$ under no-jump evolution. Before considering the most general case, we start with an example of with the optimized code (D1), $$|W_\uparrow\rangle = \frac{1}{\sqrt{6}}\left(\sqrt{7-\sqrt{17}}\,|0\rangle + \sqrt{\sqrt{17}-1}\,|3\rangle\right), \quad (E1)$$

$$|W_\downarrow\rangle = \frac{1}{\sqrt{6}}\left(\sqrt{9-\sqrt{17}}\,|1\rangle - \sqrt{\sqrt{17}-3}\,|4\rangle\right),$$

whose QECC matrix for $\bar{\varepsilon} = \{1, \hat{a}\}$ is diagonal. But for $\varepsilon_1 = \{\hat{E}_0, \hat{E}_1\}$ the nondiagonal elements do not identically vanish, $$\langle W_\sigma|\hat{E}_1\hat{E}_0|W_{\sigma'}\rangle \approx \langle W_\sigma|\sqrt{\kappa\Delta t}\,\hat{a} - \sqrt{(\kappa\Delta t)^3}\,\hat{n}\hat{a}|W_{\sigma'}\rangle + O[(\kappa\Delta t)^2] = \quad (E2a)$$

$$\langle W_\sigma|\sqrt{(\kappa\Delta t)^3}\,\hat{n}\hat{a}|W_{\sigma'}\rangle + O[(\kappa\Delta t)^2],$$

due the slight mixing by the no-jump evolution. As there is a non-vanishing term $$(\kappa\Delta t)^{\frac{3}{2}}\langle W_\uparrow|\hat{n}a|W_\downarrow\rangle$$

in the QECC matrix, one may wonder whether the highest uncorrectable error for $\varepsilon_1$ with the code (D1) is of the order of $(\kappa\Delta t)^2$ or $$(\kappa\Delta t)^{\frac{3}{2}}.$$

The effect of this is best seen by explicitly going through the error and recovery processes. Under the no-jump and photon jump errors, the quantum state $|\psi\rangle = \alpha|W_\uparrow\rangle + \beta|W_\downarrow\rangle$ transforms, respectively, to $$|\psi'_\ell\rangle = \hat{E}_\ell|\psi\rangle/\langle\psi|\hat{E}_\ell^\dagger\hat{E}_\ell|\psi\rangle^{\frac{1}{2}} \quad \text{(E2a)}$$

$$|\psi_0\rangle = |\psi\rangle + \kappa\Delta t(\Gamma_0\alpha|E_\uparrow^0\rangle + \gamma_0\beta|E_\downarrow^0\rangle),$$

$$|\psi_1\rangle = \alpha\left(1 - \frac{1}{2}\Gamma_0^2|\beta|^2\kappa\Delta t\right)|E_\uparrow^1\rangle + \beta(1-|\alpha|^2\gamma_1\kappa\Delta t)|E_\downarrow^1\rangle, + \beta\Gamma_0\kappa\Delta t|W_\uparrow\rangle \quad \text{(E2b)}$$

to the first order in $\kappa\Delta t$, where the coefficients are $\Gamma_0 = \sqrt{(\sqrt{17}-3)/2}$, $$\gamma_0 = \frac{1}{2}\sqrt{3\sqrt{17}-11},$$

and $\gamma_1 = 2/(3+\sqrt{17})$ are independent on $\alpha$ and $\beta$. The normalized error words for the no-jump errors are $$|E_\uparrow^0\rangle = \frac{1}{\sqrt{6}}\left(\sqrt{\sqrt{17}-1}|0\rangle - \sqrt{7-\sqrt{17}}|3\rangle\right), \quad \text{(E3a)}$$

$$|E_\downarrow^0\rangle = \frac{1}{\sqrt{6}}\left(\sqrt{\sqrt{17}-3}|1\rangle + \sqrt{9-\sqrt{17}}|4\rangle\right), \quad \text{(E3b)}$$

and respectively for the photon loss errors, $$|E_\uparrow^1\rangle = 2, |E_\downarrow^1\rangle = |E_\uparrow^0\rangle, \quad \text{(E4)}$$

where one notices that the error words overlap between the two errors $|E_\downarrow^1\rangle = |E_\uparrow^0\rangle$ captured by the non-vanishing non-diagonal term $(\kappa\Delta t)^{3/2} W_\uparrow|\hat{n}a|W_\downarrow\rangle$.

The recovery process is $R = \{\hat{U}_0(1-\hat{P}_1), \hat{U}_1\hat{P}_1\}$, where $P_1$ is projection to the subspace of words after a photon loss error $\{|E_\sigma^1\rangle\}$, the unitary operation $\hat{U}_1$ performs state transfer $|W_\sigma\rangle \leftrightarrow |E_\sigma^1\rangle$ and the unitary operation $\hat{U}_0$ performs the state transfer $|W_\downarrow\rangle \leftrightarrow |W_\downarrow\rangle + \kappa\Delta t\gamma_0|E_\downarrow^0\rangle$ similarly as with the code (Eqn. 6). Thus, the combined error and recovery processes give $$\sum_{k=0}^{1} \hat{R}_k\left(\sum_{\ell=0}^{\infty} \hat{E}_\ell\hat{\rho}\hat{E}_\ell^\dagger\right)\hat{R}_k^\dagger = \sum_{k=0}^{1} \hat{R}_k\left(\sum_{\ell=0}^{1} \hat{E}_\ell\hat{\rho}\hat{E}_\ell^\dagger\right)\hat{R}_k^\dagger + O[(\kappa\Delta t)^2] =$$

$$\sum_{k=0}^{1} \hat{R}_k(p_0|\psi_0\rangle\langle\psi_0| + p_0|\psi_1\rangle\langle\psi_1|)\hat{R}_k^\dagger + O[(\kappa\Delta t)^2] =$$

$$\sum_{k=0}^{1} \hat{R}_k[(1-n\Delta t)|\psi_0\rangle\langle\psi_0| + n\Delta t|\psi_1\rangle\langle\psi_1|]\hat{R}_k^\dagger + O[(\kappa\Delta t)^2] =$$

$$\hat{\rho} + \hat{U}_1\left[(\kappa\Delta t)^2\Gamma_0^2|\alpha|^2|E_\uparrow^0\rangle\langle E_\uparrow^0|\right]\hat{U}_1^\dagger + O[(\kappa\Delta t)^2] = \hat{\rho} + O[(\kappa\Delta t)^2]$$

where on the first line we have written the effect of the evolution by the Kraus operators with the help of the probability of process $p_i$ and the resulting state $|\psi_i\rangle\langle\psi_i|$ of Equation (E2a). From this expression we see that many terms that are first order in $|\psi_i\rangle$ together with the corresponding probability actually produce a higher order term. The second term from the left on the last line comes from the overlap between the two errors causing a misidentification error in the measurement and subsequent failure in the state transfer process, that is $\hat{R}_1\hat{E}_0\hat{\rho}\hat{E}_0^\dagger\hat{R}_1^\dagger \neq 0$. With a probability scaling with $(\kappa\Delta t)^2$ the no-jump error is corrected with the unitary correcting photon loss errors. However, since the resulting infidelity is of the order of $(\kappa\Delta t)^2$ this error can be ignored to the order $\kappa\Delta t$ we are protecting to.

APPENDIX F—THE MULTIMODE CODES

Even in the event of no photons being lost, the Kraus operator $\hat{E}_0 = \exp(-\frac{1}{2}\hat{n}\kappa\Delta t)$ has a non-trivial effect on the code words, and it is desirable that this be corrected. This can be avoided if the words are superpositions of states with the same excitation number by combining multiple physical elements. In particular, some multimode bosonic codes have the same structure as the single mode codes presented here, but entangled across multiple photon modes, e.g.

$$|W_\uparrow\rangle = \frac{1}{\sqrt{2}}(|04\rangle + |40\rangle), |W_\downarrow\rangle = |22\rangle, \quad \text{(F1)}$$

where nm is a state with n photons in one mode and m in the other. This code consists of two copies of the one mode code, Eqn. 6, with the words entangled between two modes. These codes could be realized in recently constructed systems of two cavities coupled to a common transmon qubit, used to perform unitary operations on the combined cavity system.

Assuming identical photon decay rates $\kappa$ for both modes, the Kraus evolution operator in the absence of photon losses from either mode is $\hat{E}_{00} = \exp(-(\hat{n}_1+\hat{n}_2)\kappa\Delta t)$, so that $\hat{E}_{00}|W_\sigma\rangle = \exp(-2\kappa\Delta t)W_\sigma$ and the code words are unchanged. The correctable errors are still single photon losses, which can occur from either of the two modes, giving rise to different error words:

$$|W_\uparrow\rangle |E_\uparrow^{11}\rangle = |30\rangle \text{ or } |E_\uparrow^{21}\rangle = |03\rangle, \quad \text{(F2a)}$$

$$|W_\downarrow\rangle \to |E_\downarrow^{11}\rangle = |12\rangle \text{ or } |E_\downarrow^{21}\rangle = |21\rangle. \quad \text{(F2b)}$$

where $|E_\sigma^{i1}\rangle$ is the error word after a photon loss from mode i. A parity measurement on each mode can distinguish from which mode the photon was lost, and so be used to determined whether to correct the error words $|E_\sigma^{11}\rangle$ or $|E_\sigma^{21}\rangle$. The unitary operations required for error correction are swaps $|E_\sigma^{i1}\rangle \leftrightarrow |W_\sigma\rangle$, that is unitary operations $$\hat{U}_{i1} = \sum_\sigma [|E_\sigma^{i1}\rangle\langle W_\sigma| + |W_\sigma\rangle\langle E_\sigma^{i1}|] + 1_{res}, \quad \text{(F3)}$$

where $1_{res}$ denotes the identity operation that completes $\hat{U}_{i1}$ to a unitary operation in the Hilbert space with total number of bosonic excitations $\leq 4$. These are similar to the one-mode corrections, except that they involve creating states that are entangled between the two modes. This may be realizable using an experimental setup comprising entanglement between two cavities. However, such an approach is likely to have lower fidelity than the equivalent one-mode operations.

As in the single mode code, the fidelity of the error correction may be determined by the rate of uncorrectable errors and for small $\kappa\Delta t$ this is dominated by two photon losses. There are three paths of two photon loss from the states of the two-mode code, compared to one path for the one mode code, Eqn. 6. Assuming equal $\kappa$, the rate of two photon losses via each path is the same, so the rate of uncorrectable errors for the two-mode code is three times larger than the one-mode code. Which code is preferable will depend on the fidelity of the no-jump correction for the one-mode code, as the need for this operation may be eliminated in the two-mode case.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a circuit quantum electrodynamics system that includes a physical qubit dispersively coupled to a quantum mechanical oscillator, the method comprising:
   measuring a parity of a first state of the quantum mechanical oscillator;
   subsequent to measuring the parity of the first state, measuring a parity of a second state of the quantum mechanical oscillator, the second state being different from the first state;
   applying a first drive waveform to the quantum mechanical oscillator; and
   applying a second drive waveform to the physical qubit concurrent with the application of the first drive waveform,
   wherein the first drive waveform and the second drive waveform are selected based at least in part on a result of comparing the measured parity of the second state to the measured parity of the first state, and
   wherein application of the first drive waveform and the second drive waveform, at least in part, transition the quantum mechanical oscillator from the second state back to the first state.

2. The method of claim 1, wherein the first and second states are superpositions of the same plurality of photon number states, and wherein the first and second states have different amplitudes.

3. The method of claim 2, wherein the first and second drive waveforms are configured based on a duration between measuring the parity of the first state and measuring the parity of the second state.

4. The method of claim 1, wherein measuring the parity of the first and second states each comprises measuring photon number parity modulo 2.

5. The method of claim 1, wherein the first state is a superposition of a plurality of photon number states.

6. The method of claim 5, wherein the first state is a superposition of two states that have equal mean photon numbers.

7. The method of claim 6, wherein the first state is a superposition of $|W_\downarrow\rangle$ and $|W_\uparrow\rangle$ given by:

$$|W_{\uparrow/\downarrow}\rangle = \frac{1}{\sqrt{2^N}} \sum_{p\,\text{even/odd}}^{N+1} \sqrt{\binom{N+1}{p}} |p(S+1)\rangle,$$

where N and S are positive integers, and $|n\rangle$ denotes a photon number state with n photons.

8. The method of claim 6, wherein the first state is a superposition of two states that each have a first mean photon number, and wherein the second state is a superposition of two states that each have a second mean photon number, different from the first mean photon number.

9. The method of claim 6, wherein the first and second drive waveforms are configured based on the values of $|W_\downarrow\rangle$ and $|W_\uparrow\rangle$.

10. The method of claim 1, wherein the first and second drive waveforms are selected from a computer readable medium storing a plurality of previously determined drive waveforms.

11. The method of claim 1, wherein measuring the parity of the first and second states each comprises measuring the photon number parity modulo N, where N is an integer greater than 2.

12. The method of claim 1, wherein said transition of the quantum mechanical oscillator from the second state back to the first state does not pass through a ground state of the quantum mechanical oscillator.

13. The method of claim 1, wherein the quantum mechanical oscillator is a microwave cavity.

14. The method of claim 1, wherein the physical qubit is a transmon qubit.

15. A system, comprising:
   a circuit quantum electrodynamics system that includes a physical qubit dispersively coupled to a quantum mechanical oscillator;
   at least one computer readable medium storing a plurality of drive waveforms;
   at least one controller configured to:
     measure a parity of a first state of the quantum mechanical oscillator;
     subsequent to measuring the parity of the first state, measure a parity of a second state of the quantum mechanical oscillator;
     select a first drive waveform and a second drive waveform from amongst the stored plurality of drive waveforms based at least in part on a result of comparing the measured parity of the second state to the measured parity of the first state; and at least one electromagnetic radiation source configured to:
- apply the first drive waveform to the quantum mechanical oscillator; and
- apply the second drive waveform to the physical qubit concurrent with the application of the first drive waveform.

16. The system of claim 15, wherein the first and second drive waveforms are configured based on a duration between measuring the parity of the first state and measuring the parity of the second state.

17. The system of claim 15, wherein measuring the parity of the first and second states each comprises measuring photon number parity modulo 2.

18. The system of claim 15, wherein measuring the parity of the first and second states each comprises measuring the photon number parity modulo N, where N is an integer greater than 2.

19. The system of claim 15, wherein application of the first and second drive waveforms is configured to transition the quantum mechanical oscillator from the second state back to the first state without passing through a ground state of the quantum mechanical oscillator.

20. The system of claim 15, wherein the quantum mechanical oscillator is a microwave cavity.

21. The system of claim 15, wherein the physical qubit is a transmon qubit.

* * * * *